US012577376B2

(12) United States Patent
Niese et al.

(10) Patent No.: US 12,577,376 B2
(45) Date of Patent: Mar. 17, 2026

(54) MOLDED ARTICLES WITH LASER-FORMED PATTERN

(71) Applicant: Celanese International Corporation, Irving, TX (US)

(72) Inventors: Sarah Ann Niese, Amelia, OH (US); Kent Miller, Nicholasville, KY (US)

(73) Assignee: Celanese Interntaional Corporation, Irving, TX (US)

( * ) Notice: Subject to any disclaimer, the term of this patent is extended or adjusted under 35 U.S.C. 154(b) by 675 days.

(21) Appl. No.: 17/988,294

(22) Filed: Nov. 16, 2022

(65) Prior Publication Data

US 2023/0151187 A1 May 18, 2023

Related U.S. Application Data

(60) Provisional application No. 63/331,426, filed on Apr. 15, 2022, provisional application No. 63/279,868, filed on Nov. 16, 2021.

(51) Int. Cl.

| | |
|---|---|
| ***C08F 2/46*** | (2006.01) |
| ***C08F 2/50*** | (2006.01) |
| ***C08G 61/04*** | (2006.01) |
| ***C08K 3/08*** | (2006.01) |
| ***C08K 3/22*** | (2006.01) |
| ***C08K 5/13*** | (2006.01) |
| ***C08K 9/02*** | (2006.01) |

(52) U.S. Cl.

CPC .................. *C08K 9/02* (2013.01); *C08K 3/08* (2013.01); *C08K 3/22* (2013.01); *C08K 5/13* (2013.01); *C08K 2003/0812* (2013.01); *C08K 2003/2241* (2013.01)

(58) Field of Classification Search

CPC .......... C08K 3/2279; C08K 3/08; C08K 3/22; C08K 3/013; C08K 5/13; C08K 9/02; C08K 2003/0812; C08K 2003/2241; C08L 59/02

USPC ............................................. 522/2, 1; 520/1

See application file for complete search history.

(56) References Cited

U.S. PATENT DOCUMENTS

| | | | | |
|---|---|---|---|---|
| 4,125,582 | A | 11/1978 | Langlois | |
| 4,161,470 | A | 7/1979 | Calundann | |
| 4,183,673 | A | 1/1980 | Easley et al. | |
| 5,053,176 | A | 10/1991 | Cameron et al. | |
| 5,489,656 | A | 2/1996 | Ohtsuka et al. | |
| 5,616,680 | A | 4/1997 | Linstid | |
| 6,114,492 | A | 9/2000 | Linstid et al. | |
| 6,231,196 | B1 | 5/2001 | Mahachek | |
| 6,514,611 | B1 | 2/2003 | Shepherd et al. | |
| 7,223,809 | B2 | 5/2007 | Notorgiacomo | |
| 8,053,499 | B2 | 11/2011 | Disch et al. | |
| 8,794,724 | B2 | 8/2014 | Costin et al. | |
| 2001/0045680 | A1 | 11/2001 | Blasius et al. | |
| 2009/0048373 | A1* | 2/2009 | Clauss | B41M 5/267 524/133 |
| 2009/0266804 | A1 | 10/2009 | Costin et al. | |
| 2009/0305008 | A1* | 12/2009 | Nichols | B44F 9/02 264/75 |
| 2013/0078481 | A1 | 3/2013 | Gronner et al. | |

FOREIGN PATENT DOCUMENTS

| | | | |
|---|---|---|---|
| EP | 0931807 | A2 | 7/1999 |
| JP | 2002127599 | A | 5/2002 |
| WO | WO1997037825 | A1 | 10/1997 |
| WO | WO2004058851 | A1 | 7/2004 |

OTHER PUBLICATIONS

PCT Search Report Corresponding to Application No. PCT/US2022/050048 on Feb. 21, 2023.

* cited by examiner

*Primary Examiner* — Jessica Whiteley
(74) *Attorney, Agent, or Firm* — Dority & Manning, P.A.

(57) ABSTRACT

Molded articles are disclosed having a pattern formed into a surface of the article. For example, the molded article can include a facing surface and the pattern can cover greater than about 10%, such as greater than about 30% of the surface area of the facing surface. The pattern can be formed using high intensity light that reacts with an additive contained in the polymer composition used to form the article. The resulting pattern can not only have a unique and distinctive appearance but can also improve one or more properties of the molded article, such as the tactile feel of the article.

25 Claims, 3 Drawing Sheets

MOLDED ARTICLES WITH LASER-FORMED PATTERN

RELATED APPLICATIONS

The present application is based upon and claims priority to U.S. Provisional Patent Application Ser. No. 63/279,868, having a filing date of Nov. 16, 2021 and U.S. Provisional Patent Application Ser. No. 63/331,426, having a filing date of Apr. 15, 2022, both of which are incorporated herein by reference.

BACKGROUND

Structural polymers such as plastic materials are used in numerous and diverse applications. In fact, those skilled in the art continue to strive to replace parts conventionally made from metal and wood with those made from polymers. The polymers, for instance, may offer various advantages with respect to strength properties, chemical resistance, and/or cost.

One problem that has been encountered in producing molded polymer articles, however, is the ability to produce articles with a distinctive look or appearance. For instance, molded polymer articles are generally uniform in color. In certain applications, however, multi-colored or multi-shaded parts are desired. Thus, in the past, non-dispersing pigments or pigment particles have been incorporated into polymers in order to produce articles having contrasting colors. Such non-dispersing pigments, for instance, have been used to produce speckled surfaces or parts having a tortoise-like appearance. Processes for producing molded articles having contrasting color properties are disclosed, for instance, in European Patent Application No. EP 0931807, International PCT Application Publication No. WO 97/37825, U.S. Pat. Nos. 4,125,582, 4,183,673, 5,053,176, 5,489,656, and U.S. Patent Application Publication No. 2001/0045680, which are all incorporated herein by reference.

When attempting to produce molded polymer articles having multiple colors or shades, however, problems have been experienced in producing articles with the desired effect without adversely impacting other properties of the polymer. For instance, producing polymer articles with multiple colored components can adversely impact upon the strength of the resulting material depending upon the mixture of materials that are used to produce the part.

As an alternative to blending different colored polymers together, molded polymer articles have also been printed or painted with multiple colors or patterns. Applying surface films to the polymer articles, however, creates exorbitant costs and can be very labor intensive. In addition, the decorative coatings are typically not wear-resistant and have a tendency to wear off over time.

In view of the above, a need currently exists for a method of producing molded polymer articles with a surface pattern that does not significantly affect the mechanical properties of the article. A need also exists for molded articles with a surface pattern that actually have at least one enhanced property.

SUMMARY

In general, the present disclosure is directed to a molded article made from a semi-crystalline thermoplastic polymer in which a pattern has been applied to at least a portion of the surface of the article using a focused light beam such as a laser. The pattern applied to the surface of the molded article can occupy a significant portion of the surface area of where the pattern has been applied. The pattern can not only enhance the appearance of the molded article but can also be applied without degrading one or more properties of the polymeric material. In fact, in one embodiment, the pattern can change the surface characteristics of the article in a manner that provides one or more benefits or advantages. For example, the pattern can enhance the tactile feel of the molded article. In addition, the pattern can change the coefficient of friction of the surface in a manner that makes the polymer article easier to hold or grip.

In one embodiment, for instance, the present disclosure is directed to a laser-marked product. The laser-marked product comprises a molded article formed from a polymer composition. The polymer composition comprises a semi-crystalline thermoplastic polymer present in the molded article in an amount of greater than about 40% by weight, such as in an amount greater than about 50% by weight, such as in an amount greater than about 60% by weight, such as in an amount greater than about 70% by weight, such as in an amount greater than about 80% by weight. The polymer composition further contains at least one coloring agent. The molded article defines a facing surface having a surface area. The facing surface includes a laser-marked pattern that has been directly applied to the facing surface. The laser-marked pattern includes a plurality of non-linear pattern elements that extend over the facing surface. The laser-marked pattern occupies from about 10% to about 90% of the surface area of the facing surface. For example, the laser-marked pattern can occupy greater than about 20%, such as greater than about 30%, such as greater than about 40% of the surface area of the facing surface.

The laser-marked pattern applied to the molded article can be designed to have an overall appearance as desired. For instance, the laser-marked pattern can have a woodgrain-like appearance or a stone-like appearance. For instance, the pattern can have a marble-like appearance or a granite-like appearance. In one embodiment, at least some of the non-linear pattern elements have a length of at least about 2.5 cm, such as at least about 3.5 cm, such as at least about 4.5 cm, such as at least about 5.5 cm. In one embodiment, the laser-marked pattern includes a plurality of concentric-like pattern groups. Each group can include at least two to about eight non-linear pattern elements where an arc or curvature on one pattern element is followed by an adjacent pattern element.

The polymer composition generally contains at least one laser activatable additive in order to produce the laser marked pattern. One example of a laser activatable additive is antimony trioxide. In one aspect, the coloring agent contained in the polymer composition can be laser activatable.

In one embodiment, the facing surface of the polymer article displays a background color and the laser-marked pattern displays a color and wherein the laser-marked pattern color is the same as the background color but has a different shade. Alternatively, the laser-marked pattern color can be different than the background color.

In one embodiment, the facing surface contains a background matrix formed from the polymer composition. The laser-marked pattern can comprise domains that are contained within the background matrix.

The facing surface of the laser-marked product can include a laser-marked pattern that is surrounded by a background pattern. The laser-marked pattern has a different color than the background pattern in accordance with the present disclosure. In addition, the laser-marked pattern can have different friction characteristics than the background pattern. For instance, the laser-marked pattern can have a higher coefficient of friction and be more textured than the background pattern. In one aspect, the laser-marked pattern can also be a raised pattern. For instance, the laser-marked pattern can have portions that extend above the background pattern in an amount greater than about 5 microns, such as in an amount greater than about 10 microns, such as in an amount greater than about 20 microns, such as in an amount greater than about 30 microns, such as in an amount greater than about 40 microns, such as in an amount greater than about 50 microns, such as in an amount greater than about 100 microns, such as in an amount greater than about 150 microns, such as in an amount greater than about 200 microns, and generally in an amount less than about 1,000 microns, such as in an amount less than about 500 microns, such as in an amount less than about 300 microns.

Coloring agents that may be incorporated into the polymer composition include titanium dioxide or a black carbonaceous pigment. The titanium dioxide can be surface coated, such as with aluminum. In one aspect, the titanium dioxide can be in the rutile form. The black carbonaceous pigment, on the other hand, can be formed from bone char from the bones of one or more mammals. Each of the coloring agents contained in the polymer composition can have a relatively small particle size. For instance, the average particle size of the coloring agent can be less than about 250 nm, such as less than about 100 nm, and generally greater than about 10 nm.

The semi-crystalline thermoplastic polymer incorporated in the polymer composition can be a polyoxymethylene polymer, a polyester polymer such as a polybutylene terephthalate polymer, a liquid crystal polymer, a polyphenylene sulfide polymer, or the like. In one embodiment, the polymer composition can contain a lubricant, such as ethylene bis stearamide. The polymer composition can also contain one or more antioxidants, such as a hindered phenolic antioxidant.

Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying figures, in which.

Figure 1:
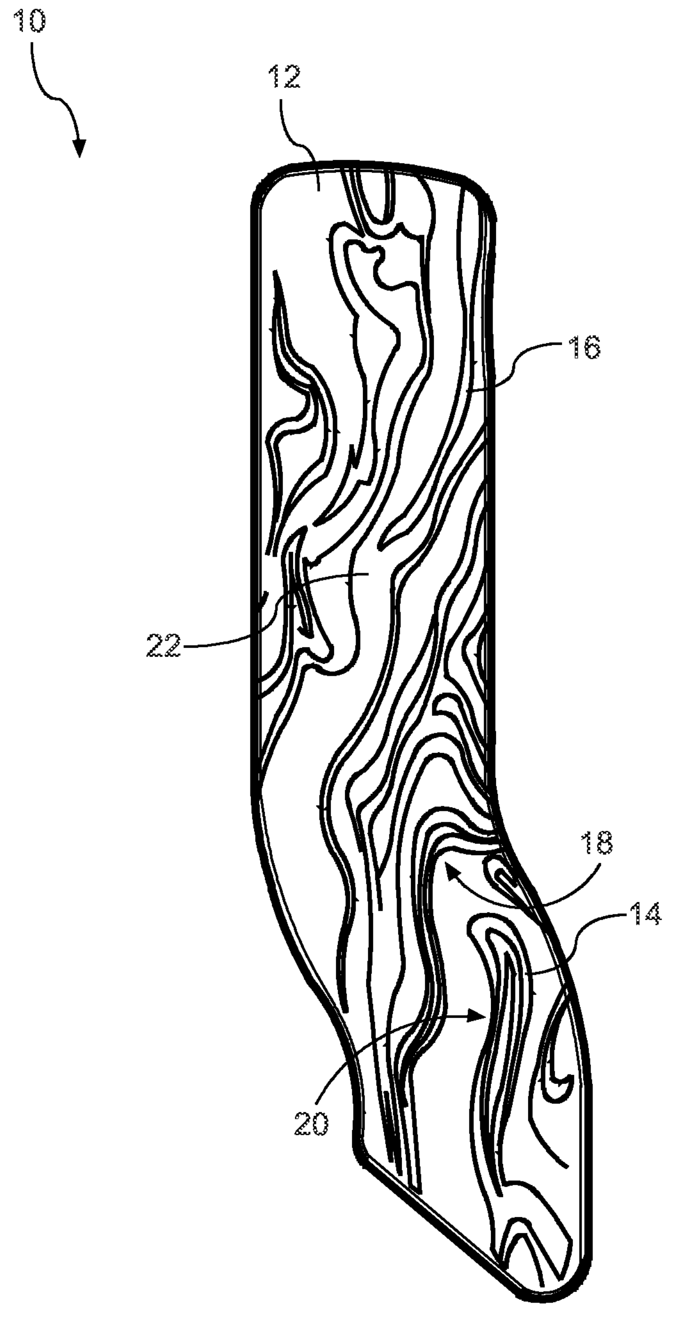
FIG. 1 is a perspective view of one embodiment of a molded article made in accordance with the present disclosure.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only and is not intended as limiting the broader aspects of the present disclosure.

In general, the present disclosure is directed to molded articles having a distinctive and unique surface pattern. The pattern can be formed directly into the surface of the molded article without having to coat the surface with any auxiliary material, paint or ink composition. The pattern formed into the surface of the molded article can not only improve the aesthetic appearance of the article but can also have various functional advantages and benefits. For instance, the pattern can change the surface characteristics in a manner that improves the tactile feel of the molded article. In one aspect, the pattern can change the coefficient of friction of the surface such that the surface has a different friction characteristic within the pattern in comparison to the friction characteristics outside the pattern. The difference in frictional characteristics can improve the grip properties of the molded article in a beneficial manner. In one aspect, the laser-marked pattern can be a raised pattern that also changes the overall friction characteristics of the surface of the molded article.

The molded article is formed from a polymer composition containing primarily a semi-crystalline thermoplastic polymer. The polymer composition includes at least one coloring agent that may or may not be laser activatable. The polymer composition can also contain a laser activatable additive apart from the coloring agent. The polymer composition is used to mold various different polymeric articles. Polymer articles made according to the present disclosure include a facing surface that, in many applications, is intended to be visible to a user during use. In accordance with the present disclosure, at least the facing surface of the molded article is laser-marked with a pattern that can extend generally over the entire facing surface. Although any suitable pattern can be laser-marked onto the facing surface, in one embodiment, the pattern can be designed to mimic a natural look or appearance. For instance, the pattern can be designed to mimic woodgrain or a stone. The pattern, for instance, can have a marble-like look, a quartz-like look, a granite-like look, or the like. In this manner, molded articles made according to the present disclosure can be used to replace natural wood, stone, or other non-decorative plastic parts.

Patterned articles made according to the present disclosure can be used in all different types and numerous applications. For example, the molded articles can be used to produce vehicle parts, particularly interior automotive parts. The molded articles can also be used to produce consumer appliance parts, parts for use in the food service industry, parts for medical devices, industrial parts, and the like.

Referring to FIG. 1, for exemplary purposes, a molded article 10 is shown made in accordance with the present disclosure. The molded article 10, for instance, can be designed to be part of a handle or a trim bezel. As shown, the molded article 10 includes a facing surface 12. The facing surface 12, for many applications, will remain visible to a user after the molded article has been installed into a bigger assembly. The facing surface 12 can cover the entire surface area of the molded article 10. Alternatively, as shown in FIG. 1, the facing surface 12 can be on one side of the molded article opposite a back side of the article.

In accordance with the present disclosure, the facing surface 12 includes a pattern 14 that can be a laser-marked pattern directly applied to the facing surface. As shown in FIG. 1, the pattern 14 can include a plurality of non-linear pattern elements 16. The laser-marked pattern 14 can occupy a substantial portion of the facing surface 12 and can generally extend over the entire facing surface. For example, the laser-marked pattern can occupy greater than about 10% of the surface area of the facing surface, such as greater than about 20% of the surface area of the facing surface, such as greater than about 30% of the surface area of the facing surface, such as greater than about 40% of the surface area of the facing surface, such as greater than about 50% of the surface area of the facing surface, such as greater than about 60% of the surface area of the facing surface, and generally less than about 90% of the surface area of the facing surface, such as generally less than about 80% of the surface area of the facing surface, such as generally less than about 70% of the surface area of the facing surface.

The pattern 14 can be digitally produced from a computer-controlled laser. Thus, the pattern can have any desired appearance or look. In the embodiment illustrated in FIG. 1, the non-linear pattern elements 16 generally extend over the length and width of the facing surface 12. For instance, the non-linear pattern elements 16 can have a length of at least about 2.5 cm, such as at least about 3.5 cm, such as at least about 4.5 cm, such as at least about 5.5 cm. The length of the non-linear pattern elements 16 is generally not limited and can be, for instance, the same as the length of the facing surface. In one aspect, the non-linear pattern elements 16 can have a length of less than about 50 cm, such as less than about 30 cm, such as less than about 20 cm.

In the embodiment illustrated in FIG. 1, the pattern 14 can include a plurality of concentric-like pattern groups, such as group 18, group 20, and group 22. As shown in groups 18, 20 and 22, at least one non-linear pattern element 16 follows the curvature or arc of an adjacent non-linear pattern element 16. In group 20, there are two concentric-like non-linear pattern elements. The other concentric-like pattern groups 18 and 20, on the other hand, can contain at least 3 non-linear pattern elements. For instance, each group can include greater than about 2 pattern elements, such as greater than about 4 pattern elements, such as greater than about 6 pattern elements, and generally less than about 16 pattern elements, such as less than about 12 pattern elements, such as less than about 8 pattern elements.

The pattern of non-linear pattern elements 16 in combination with the concentric-like pattern groups produces an overall design that can mimic various natural materials. For instance, the design in FIG. 1 has a stone-like look, such as a marble-like look. Similar patterns can also be created that would have the appearance of a woodgrain pattern.

In addition to having aesthetic appeal, the pattern 14 can also provide various different functional benefits and advantages. For example, as described above, the pattern can improve the tactile feel of the facing surface 12. In addition, the pattern can be formed into the surface of the molded article 10 in a manner that changes the coefficient of friction of the surface. By changing the coefficient of friction of the surface and by covering a substantial portion of the facing surface, the pattern can dramatically improve the grip properties of the molded article 10, which makes the molded article well suited to producing handles, railings, and other parts that are to be grabbed, pulled, or held.

The molded article 10 and the laser-marked pattern 14 can display any suitable color in accordance with the present disclosure. As described above, the molded article 10 is formed from a semi-crystalline thermoplastic polymer that contains at least one coloring agent. One or more coloring agents can be incorporated into the polymer composition for achieving a desired color, shade, hue, and the like.

As shown in FIG. 1, in one embodiment, the laser-marked pattern 14 comprises domains contained in a background matrix formed from the thermoplastic polymer composition. The color of the laser-marked pattern 14 and the color of the background matrix of the facing surface 12 can also vary depending upon the particular application. In one embodiment, the laser-marked pattern can be a different color than the background matrix. For example, in one embodiment, the background matrix can be a white color while the laser-marked pattern 14 can be silver, gold, black, or any other suitable color. Alternatively, the background matrix can be a black color and the laser-marked pattern can be a white color.

Alternatively, the color of the background matrix and the color of the laser-marked pattern can be the same but can be a different shade of the same color. The laser-marked pattern, however, still remains visible due to the different shade and to the different texture. Having the background matrix and the laser-marked pattern be the same color but a different shade creates a very distinctive and unique appearance. In this embodiment, the background matrix and the laser-marked pattern can be virtually any color, such as gold, silver, black, white, blue, red, green, gray, yellow, or the like.

Figure 2:
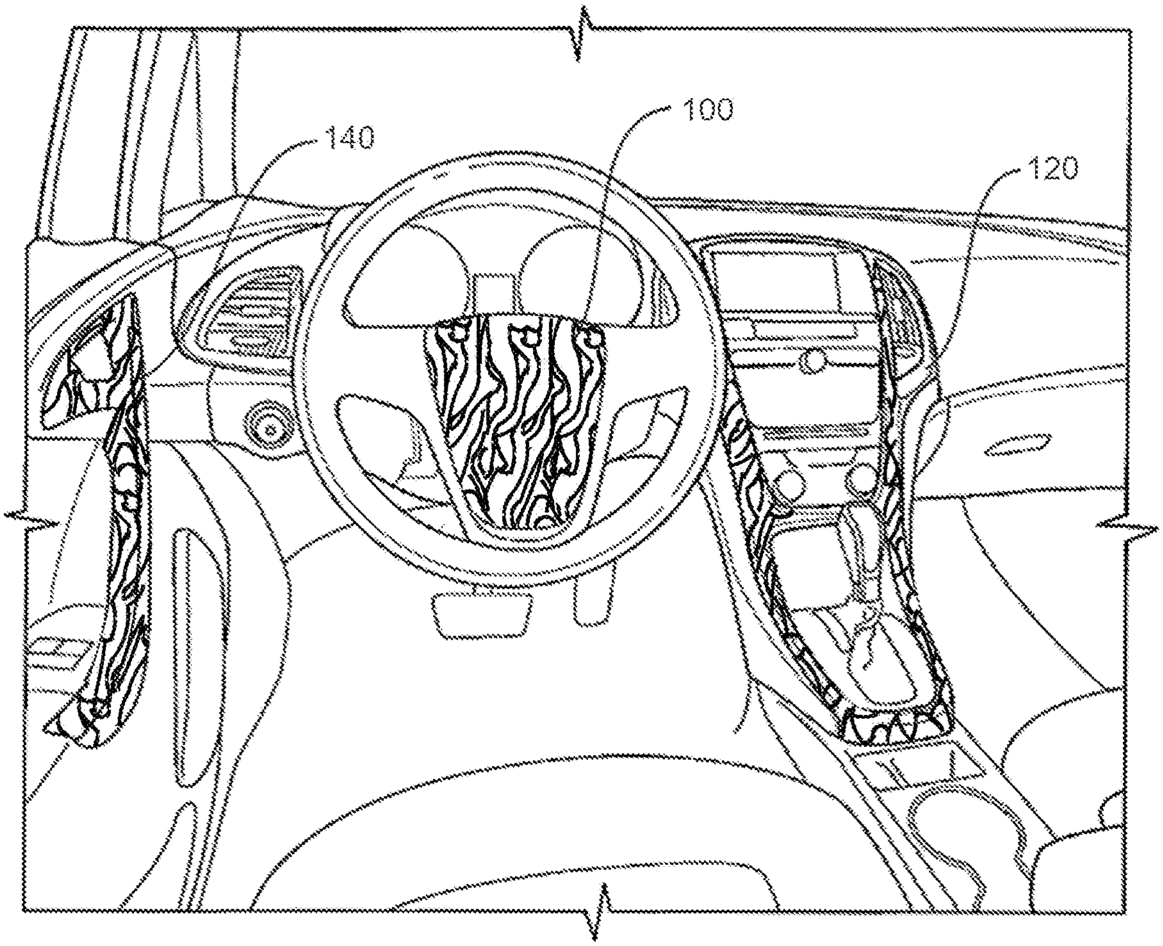
FIG. 2 is a perspective view of a vehicle interior illustrating various molded parts made in accordance with the present disclosure.

As described above, the molded article 10 as shown in FIG. 1 may be used in many diverse and numerous applications. For example, referring to FIG. 2, the interior of an automobile is shown. As illustrated, the molded article of the present disclosure can be used as a trim bezel in multiple different locations. For instance, the molded article may be used on the steering wheel column 100 or as a part 120 to surround the interior of the controls. In one embodiment, the molded article of the present disclosure can comprise a handle 140 that has improved tactile properties.

Figure 3:
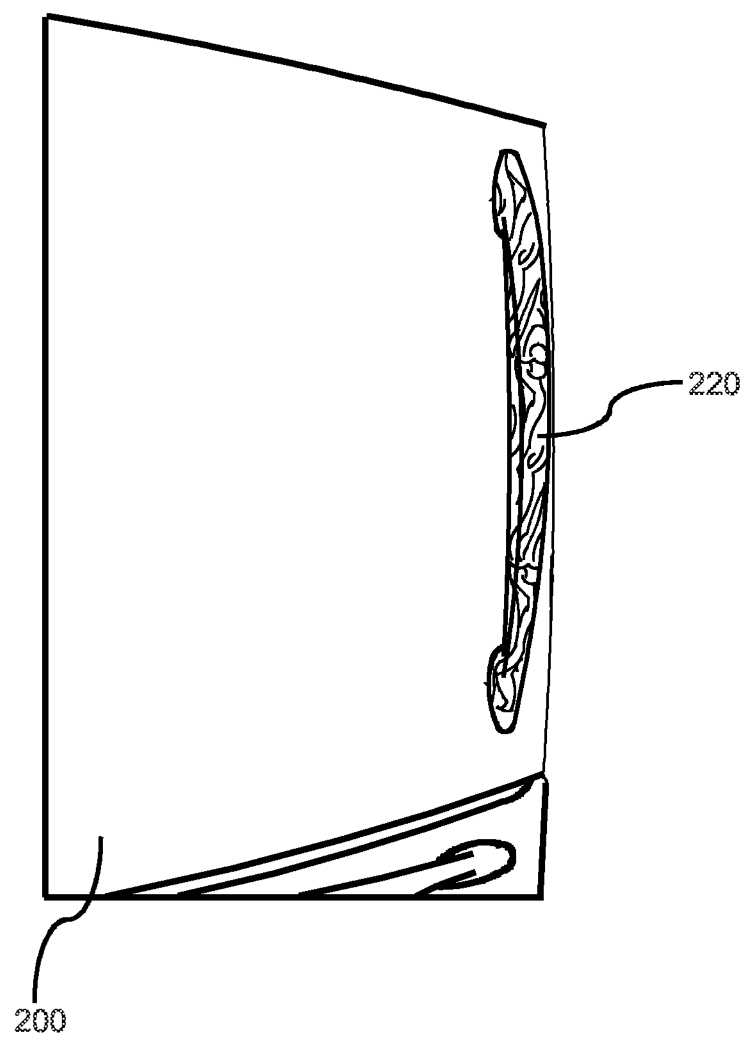
FIG. 3 is a perspective view of a refrigerator illustrating a handle made in accordance with the present disclosure.

In addition to automotive parts, the molded article of the present disclosure can also be used as a part for a consumer appliance. For example, referring to FIG. 3, a refrigerator 200 is shown that includes a handle 220 made in accordance with the present disclosure.

Molded articles made according to the present disclosure are formed from a semi-crystalline thermoplastic polymer. In one aspect, the thermoplastic polymer can have a relatively high melting point, such as greater than about 150° C., such as greater than about 160° C., such as greater than about 170° C. In one aspect, polymers having melting points of greater than about 200° C., such as greater than about 210° C., such as greater than about 220° C. can be used.

One or more thermoplastic polymers can be present in the polymer composition used to form the molded articles in an amount greater than about 30% by weight, such as in an amount greater than about 40% by weight, such as in an amount greater than about 50% by weight, such as in an amount greater than about 60% by weight, such as in an amount greater than about 70% by weight, such as in an amount greater than about 80% by weight, such as in an amount greater than about 90% by weight, such as in an amount greater than about 95% by weight. The one or more thermoplastic polymers are generally present in the polymer composition in an amount less than about 98% by weight, such as in an amount less than about 90% by weight, such as in an amount less than about 80% by weight.

In one embodiment, the thermoplastic semi-crystalline polymer or matrix polymer contained in the polymer composition is a polyoxymethylene polymer. For example, the polyoxymethylene polymer can be a polyoxymethylene homopolymer or a polyoxymethylene copolymer. According to one embodiment, the polyoxymethylene is a homo- or copolymer which comprises at least 50 mol. %, such as at least 75 mol. %, such as at least 90 mol. % and such as even at least 97 mol. % of $-CH_2O-$repeat units.

In one embodiment, a polyoxymethylene copolymer is used. The copolymer can contain from about 0.01 mol. % to about 20 mol. % and in particular from about 0.5 mol. % to about 10 mol. % of repeat units that comprise a saturated or ethylenically unsaturated alkylene group having at least 2 carbon atoms, or a cycloalkylene group, which has sulfur atoms or oxygen atoms in the chain and may include one or more substituents selected from the group consisting of alkyl cycloalkyl, aryl, aralkyl, heteroaryl, halogen or alkoxy. In one embodiment, a cyclic ether or acetal is used that can be introduced into the copolymer via a ring-opening reaction.

Preferred cyclic ethers or acetals are those of the formula:

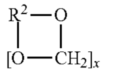

in which x is 0 or 1 and $R^2$ is a $C_2$-$C_4$-alkylene group which, if appropriate, has one or more substituents which are $C_1$-$C_4$-alkyl groups, or are $C_1$-$C_4$-alkoxy groups, and/or are halogen atoms, preferably chlorine atoms. Merely by way of example, mention may be made of ethylene oxide, propylene 1,2-oxide, butylene 1,2-oxide, butylene 1,3-oxide, 1,3-dioxane, 1,3-dioxolane, and 1,3-dioxepan as cyclic ethers, and also of linear oligo- or polyformals, such as polydioxolane or polydioxepan, as comonomers. It is particularly advantageous to use copolymers composed of from 99.5 to 95 mol. % of trioxane and of from 0.01 to 5 mol. %, such as from 0.5 to 4 mol. %, of one of the above-mentioned comonomers.

The polymerization can be effected as precipitation polymerization or in the melt. By a suitable choice of the polymerization parameters, such as duration of polymerization or amount of molecular weight regulator, the molecular weight and hence the MVR value of the resulting polymer can be adjusted.

In one embodiment, the polyoxymethylene polymer used in the polymer composition may contain a relatively high amount of reactive groups or functional groups in the terminal positions. The reactive groups, for instance, may comprise —OH or —$NH_2$ groups.

In one embodiment, the polyoxymethylene polymer can have terminal hydroxyl groups, for example hydroxyethylene groups and/or hydroxyl side groups, in at least more than about 50% of all the terminal sites on the polymer. For instance, the polyoxymethylene polymer may have at least about 70%, such as at least about 80%, such as at least about 85% of its terminal groups be hydroxyl groups, based on the total number of terminal groups present. It should be understood that the total number of terminal groups present includes all side terminal groups.

In one embodiment, the polyoxymethylene polymer has a content of terminal hydroxyl groups of at least 15 mmol/kg, such as at least 18 mmol/kg, such as at least 20 mmol/kg. In one embodiment, the terminal hydroxyl group content ranges from 18 to 120 mmol/kg. In an alternative embodiment, the polyoxymethylene polymer may contain terminal hydroxyl groups in an amount less than 20 mmol/kg, such as less than 18 mmol/kg, such as less than 15 mmol/kg. For instance, the polyoxymethylene polymer may contain terminal hydroxyl groups in an amount from about 5 mmol/kg to about 20 mmol/kg, such as from about 5 mmol/kg to about 15 mmol/kg. For example, a polyoxymethylene polymer may be used that has a lower terminal hydroxyl group content but has a higher melt volume flow rate.

In addition to or instead of the terminal hydroxyl groups, the polyoxymethylene polymer may also have other terminal groups usual for these polymers. Examples of these are alkoxy groups, formate groups, acetate groups or aldehyde groups. According to one embodiment, the polyoxymethylene is a homo- or copolymer which comprises at least 50 mol-%, such as at least 75 mol-%, such as at least 90 mol-% and such as even at least 95 mol-% of —$CH_2O$-repeat units.

In one embodiment, a polyoxymethylene polymer can be produced using a cationic polymerization process followed by solution hydrolysis to remove any unstable end groups. During cationic polymerization, a glycol, such as ethylene glycol or methylal can be used as a chain terminating agent. A heteropoly acid, triflic acid or a boron compound may be used as the catalyst.

The polyoxymethylene polymer can have any suitable molecular weight. The molecular weight of the polymer, for instance, can be from about 4,000 grams per mole to about 20,000 g/mol. In other embodiments, however, the molecular weight can be well above 20,000 g/mol, such as from about 20,000 g/mol to about 100,000 g/mol.

The polyoxymethylene polymer present in the composition can generally have a melt flow index (MFI) ranging from about 0.1 to about 80 $cm^3$/10 min, as determined according to ISO 1133 at 190° C. and 2.16 kg. In one embodiment, the polyoxymethylene polymer may have a melt flow index of greater than about 1 $cm^3$/10 min, such as greater than about 2 $cm^3$/10 min, such as greater than about 5 $cm^3$/10 min, such as greater than about 10 $cm^3$/10 min, such as greater than about 20 $cm^3$/10 min, such as greater than about 30 $cm^3$/10 min. The polymer may, in some cases, have a melt flow index of less than about 55 $cm^3$/10 min, such as less than about 45 $cm^3$/10 min, such as less than about 35 $cm^3$/10 min, such as less than about 25 $cm^3$/10 min, such as less than about 15 $cm^3$/10 min, such as less than about 10 $cm^3$/10 min, such as less than about 5 $cm^3$/10 min.

In another embodiment, the thermoplastic polymer may comprise a polyester polymer. Various different polyester polymers may be used in accordance with the present disclosure and combined together to form the polymer composition. Polyester polymers that may be used in accordance with the present disclosure include polyalkylene terephthalate polymers including copolymers. Such polymers include, for instance, polyethylene terephthalate polymers, polybutylene terephthalate polymers, and respective copolymers. In one aspect, a polybutylene polymer alone or in combination with a polyethylene terephthalate polymer may be used. Other polyester polymers that may be used include polycyclohexylenedimethylene terephthalate polymers.

Polyalkylene terephthalate polymers suitable for use herein are derived from an aliphatic or cycloaliphatic diol, or mixtures thereof, containing from 2 to about 10 carbon atoms and an aromatic dicarboxylic acid.

The polyesters which are derived from a cycloaliphatic diol and an aromatic dicarboxylic acid are prepared by condensing either the cis- or trans-isomer (or mixtures thereof) of, for example, 1,4-cyclohexanedimethanol with the aromatic dicarboxylic acid.

Examples of aromatic dicarboxylic acids include isophthalic or terephthalic acid, 1,2-di(p-carboxyphenyl)ethane, 4,4'-dicarboxydiphenyl ether, etc., and mixtures of these. All of these acids contain at least one aromatic nucleus. Fused rings can also be present such as in 1,4- or 1,5- or 2,6-naphthalene-dicarboxylic acids. In one embodiment, the dicarboxylic acid is terephthalic acid or mixtures of terephthalic and isophthalic acid.

Particular polyalkylene terephthalate polymers well suited for use in the present disclosure are polyethylene terephthalate polymers and polybutylene terephthalate polymers. In addition, modified or copolymers of polyethylene terephthalate polymers and/or polybutylene terephthalate polymers may be used. For instance, in one embodiment, a modifying acid or a modifying diol may be used to produce modified polyethylene terephthalate polymers and/or modified polybutylene terephthalate polymers.

As used herein, the terms “modifying acid” and “modifying diol” are meant to define compounds, which can form part of the acid and diol repeat units of a polyester, respectively, and which can modify a polyester to reduce its crystallinity or render the polyester amorphous. In one embodiment, however, the polyesters present in the polymer composition of the present disclosure are non-modified and do not contain a modifying acid or a modifying diol.

Examples of modifying acid components may include, but are not limited to, isophthalic acid, phthalic acid, 1,3-cyclohexanedicarboxylic acid, 1,4-cyclohexane dicarboxylic acid, 2,6-naphthaline dicarboxylic acid, succinic acid, glutaric acid, adipic acid, sebacic acid, suberic acid, 1,12-dodecanedioic acid, and the like. In practice, it is often preferable to use a functional acid derivative thereof such as the dimethyl, diethyl, or dipropyl ester of the dicarboxylic acid. The anhydrides or acid halides of these acids also may be employed where practical. Preferred is isophthalic acid.

Examples of modifying diol components may include, but are not limited to, neopentyl glycol, 1,4-cyclohexanedimethanol, 1,2-propanediol, 1,3-propanediol, 2-Methy-1,3-propanediol, 1,4-butanediol, 1,6-hexanediol, 1,2-cyclohexanediol, 1,4-cyclohexanediol, 1,2-cyclohexanedimethanol, 1,3-cyclohexanedimethanol, 2,2,4,4-tetramethyl 1,3-cyclobutane diol, Z,8-bis(hydroxymethyltricyclo-[5.2.1.0]-decane wherein Z represents 3, 4, or 5; 1,4-Bis(2-hydroxyethoxy)benzene, 4,4'-Bis(2-hydroxyethoxy) diphenylether [Bis-hydroxyethyl Bisphenol A], 4,4'-Bis(2-hydroxyethoxy)diphenylsulfide [Bis-hydroxyethyl Bisphenol S] and diols containing one or more oxygen atoms in the chain, e.g. diethylene glycol, triethylene glycol, dipropylene glycol, tripropylene glycol, and the like. In general, these diols contain 2 to 18, preferably 2 to 8 carbon atoms. Cycloalphatic diols can be employed in their cis or trans configuration or as mixtures of both forms.

In an alternative embodiment, the thermoplastic polymer may comprise a polyarylene sulfide polymer. The polyarylene sulfide may be a polyarylene thioether containing repeat units of the formula (I):

$$-[(Ar^1)_n-X]_m-[(Ar^2)_i-Y]_j-[(Ar^3)_k-Z]_l-[(Ar^4)_o-W]_p- \quad \text{(I)}$$

wherein $Ar^1$, $Ar^2$, $Ar^3$, and $Ar^4$ are the same or different and are arylene units of 6 to 18 carbon atoms; W, X, Y, and Z are the same or different and are bivalent linking groups selected from —$SO_2$—, —S—, —SO—, —CO—, —O—, —COO— or alkylene or alkylidene groups of 1 to 6 carbon atoms and wherein at least one of the linking groups is —S—; and n, m, i, j, k, l, o, and p are independently zero or 1, 2, 3, or 4, subject to the proviso that their sum total is not less than 2. The arylene units $Ar^1$, $Ar^2$, $Ar^3$, and $Ar^4$ may be selectively substituted or unsubstituted. Advantageous arylene systems are phenylene, biphenylene, naphthylene, anthracene and phenanthrene. The polyarylene sulfide typically includes more than about 30 mol %, more than about 50 mol %, or more than about 70 mol % arylene sulfide (—S—) units. In one embodiment the polyarylene sulfide includes at least 85 mol % sulfide linkages attached directly to two aromatic rings. In one embodiment, the polyarylene sulfide is a polyphenylene sulfide, defined herein as containing the phenylene sulfide structure —$(C_6H_4—S)_n$— (wherein n is an integer of 1 or more) as a component thereof.

Synthesis techniques that may be used in forming a polyarylene sulfide are generally known in the art. By way of example, a process for producing a polyarylene sulfide can include reacting a material that provides a hydrosulfide ion, e.g., an alkali metal sulfide, with a dihaloaromatic compound in an organic amide solvent. The alkali metal sulfide can be, for example, lithium sulfide, sodium sulfide, potassium sulfide, rubidium sulfide, cesium sulfide or a mixture thereof. When the alkali metal sulfide is a hydrate or an aqueous mixture, the alkali metal sulfide can be processed according to a dehydrating operation in advance of the polymerization reaction. An alkali metal sulfide can also be generated in situ. In addition, a small amount of an alkali metal hydroxide can be included in the reaction to remove or react impurities (e.g., to change such impurities to harmless materials) such as an alkali metal polysulfide or an alkali metal thiosulfate, which may be present in a very small amount with the alkali metal sulfide.

The dihaloaromatic compound can be, without limitation, an o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide or dihalodiphenyl ketone. Dihaloaromatic compounds may be used either singly or in any combination thereof. Specific exemplary dihaloaromatic compounds can include, without limitation, p-dichlorobenzene; m-dichlorobenzene; o-dichlorobenzene; 2,5-dichlorotoluene; 1,4-dibromobenzene, 1,4-dichloronaphthalene; 1-methoxy-2,5-dichlorobenzene; 4,4'-dichlorobiphenyl; 3,5-dichlorobenzoic acid; 4,4'-dichlorodiphenyl ether; 4,4'-dichlorodiphenylsulfone; 4,4'-dichlorodiphenylsulfoxide; and 4,4'-dichlorodiphenyl ketone. The halogen atom can be fluorine, chlorine, bromine or iodine, and 2 halogen atoms in the same dihalo-aromatic compound may be the same or different from each other. In one embodiment, o-dichlorobenzene, m-dichlorobenzene, p-dichlorobenzene or a mixture of 2 or more compounds thereof is used as the dihalo-aromatic compound. As is known in the art, it is also possible to use a monohalo compound (not necessarily an aromatic compound) in combination with the dihaloaromatic compound in order to form end groups of the polyarylene sulfide or to regulate the polymerization reaction and/or the molecular weight of the polyarylene sulfide.

The polyarylene sulfide may be a homopolymer or may be a copolymer. By a suitable, selective combination of dihaloaromatic compounds, a polyarylene sulfide copolymer can be formed containing not less than two different units. For instance, in the case where p-dichlorobenzene is used in combination with m-dichlorobenzene or 4,4'-dichlorodiphenylsulfone, a polyarylene sulfide copolymer can be formed containing segments having the structure of formula (II):

(II)

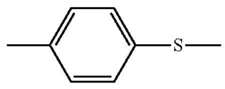

and segments having the structure of formula (III):

(III)

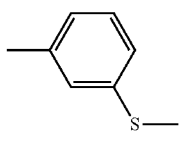

or segments having the structure of formula (IV):

(IV)

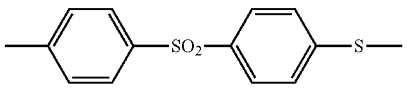

The polymerization reaction may be carried out in the presence of an organic amide solvent. Exemplary organic amide solvents used in a polymerization reaction can include, without limitation, N-methyl-2-pyrrolidone; N-ethyl-2-pyrrolidone; N,N-dimethylformamide, N,N-dimethylacetamide, N-methylcaprolactam; tetramethylurea; dimethylimidazolidinone; hexamethyl phosphoric acid triamide and mixtures thereof. The amount of the organic amide solvent used in the reaction can be, e.g., from 0.2 to 5 kilograms per mole (kg/mol) of the effective amount of the alkali metal sulfide.

The polyarylene sulfide may be linear, semi-linear, branched or crosslinked. A linear polyarylene sulfide includes as the main constituting unit the repeating unit of —(Ar—S) In general, a linear polyarylene sulfide may include about 80 mol % or more of this repeating unit. A linear polyarylene sulfide may include a small amount of a branching unit or a cross-linking unit, but the amount of branching or cross-linking units may be less than about 1 mol % of the total monomer units of the polyarylene sulfide. A linear polyarylene sulfide polymer may be a random copolymer or a block copolymer containing the above-mentioned repeating unit.

A semi-linear polyarylene sulfide may be utilized that has a cross-linking or branched structure provided by introducing into the polymer a small amount of one or more monomers having three or more reactive functional groups. For instance, between about 1 mol % and about 10 mol % of the polymer may be formed from monomers having three or more reactive functional groups. Methods that may be used in making semi-linear polyarylene sulfide are generally known in the art. By way of example, monomer components used in forming a semi-linear polyarylene sulfide can include an amount of polyhaloaromatic compounds having 2 or more halogen substituents per molecule which can be utilized in preparing branched polymers. Such monomers can be represented by the formula $R'X_n$, where each X is selected from chlorine, bromine, and iodine, n is an integer of 3 to 6, and R' is a polyvalent aromatic radical of valence n which can have up to about 4 methyl substituents, the total number of carbon atoms in R' being within the range of 6 to about 16. Examples of some polyhaloaromatic compounds having more than two halogens substituted per molecule that can be employed in forming a semi-linear polyarylene sulfide include 1,2,3-trichlorobenzene, 1,2,4-trichlorobenzene, 1,3-dichloro-5-bromobenzene, 1,2,4-triiodobenzene, 1,2,3,5-tetrabromobenzene, hexachlorobenzene, 1,3,5-trichloro-2,4,6-trimethylbenzene, 2,2',4,4'-tetrachlorobiphenyl, 2,2',5,5'-tetra-iodobiphenyl, 2,2',6,6'-tetrabromo-3,3',5,5'-tetramethylbiphenyl, 1,2,3,4-tetrachloronaphthalene, 1,2,4-tribromo-6-methylnaphthalene, and the like, and mixtures thereof.

The polymerization reaction apparatus for forming the polyarylene sulfide is not especially limited, although it is typically desired to employ an apparatus that is commonly used in formation of high viscosity fluids. Examples of such a reaction apparatus may include a stirring tank type polymerization reaction apparatus having a stirring device that has a variously shaped stirring blade, such as an anchor type, a multistage type, a spiral-ribbon type, a screw shaft type and the like, or a modified shape thereof. Further examples of such a reaction apparatus include a mixing apparatus commonly used in kneading, such as a kneader, a roll mill, a Banbury mixer, etc. Following polymerization, the molten polyarylene sulfide may be discharged from the reactor, typically through an extrusion orifice fitted with a die of desired configuration, cooled, and collected. Commonly, the polyarylene sulfide may be discharged through a perforated die to form strands that are taken up in a water bath, pelletized and dried. The polyarylene sulfide may also be in the form of a strand, granule, or powder.

The molecular weight of the polyarylene sulfide is not particularly limited, though in one embodiment, the polyarylene sulfide (which can also encompass a blend of one or more polyarylene sulfide polymers and/or copolymers) may have a relative high molecular weight. For instance a polyarylene sulfide may have a number average molecular weight greater than about 25,000 g/mol, or greater than about 30,000 g/mol, and a weight average molecular weight greater than about 60,000 g/mol, or greater than about 65,000 g/mol.

In still another embodiment, the thermoplastic polymer may comprise a wholly aromatic polyester, which may be a thermotropic liquid crystalline polymer that contains aromatic ester repeating units generally represented by the following Formula (I):

(I)

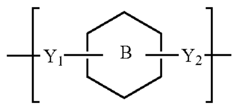

wherein, ring B is a substituted or unsubstituted 6-membered aryl group (e.g., 1,4-phenylene or 1,3-phenylene), a substituted or unsubstituted 6-membered aryl group fused to a substituted or unsubstituted 5- or 6-membered aryl group (e.g., 2,6-naphthalene), or a substituted or unsubstituted 6-membered aryl group linked to a substituted or unsubstituted 5- or 6-membered aryl group (e.g., 4,4-biphenylene); and $Y_1$ and $Y_2$ are independently O, C(O), NH, C(O)HN, or NHC(O), wherein at least one of $Y_1$ and $Y_2$ are C(O).

Examples of aromatic ester repeating units that are suitable for use in the present invention may include, for instance, aromatic dicarboxylic repeating units ($Y_1$ and $Y_2$ in Formula I are C(O)), aromatic hydroxycarboxylic repeating units ($Y_1$ is O and $Y_2$ is C(O) in Formula I), as well as various combinations thereof.

Aromatic dicarboxylic repeating units, for instance, may be employed that are derived from aromatic dicarboxylic acids, such as terephthalic acid, isophthalic acid, 2,6-naphthalenedicarboxylic acid, diphenyl ether-4,4'-dicarboxylic acid, 1,6-naphthalenedicarboxylic acid, 2,7-naphthalenedicarboxylic acid, 4,4'-dicarboxybiphenyl, bis(4-carboxyphenyl)ether, bis(4-carboxyphenyl)butane, bis(4-carboxyphenyl)ethane, bis(3-carboxyphenyl)ether, bis(3-carboxyphenyl)ethane, etc., as well as alkyl, alkoxy, aryl and halogen substituents thereof, and combinations thereof. Particularly suitable aromatic dicarboxylic acids may include, for instance, terephthalic acid ("TA"), isophthalic acid ("IA"), or 2,6-naphthalenedicarboxylic acid ("NDA"). When employed, repeating units derived from aromatic dicarboxylic acids (e.g., IA, TA, and/or NDA) typically constitute from about 1 mol. % to about 60 mol. %, in some embodiments from about 2 mol. % to about 55 mol. %, and in some embodiments, from about 10 mol. % to about 50% of the polymer.

Aromatic hydroxycarboxylic repeating units may also be employed that are derived from aromatic hydroxycarboxylic acids, such as, 4-hydroxybenzoic acid; 4-hydroxy-4'-biphenylcarboxylic acid; 2-hydroxy-6-naphthoic acid; 2-hydroxy-5-naphthoic acid; 3-hydroxy-2-naphthoic acid; 2-hydroxy-3-naphthoic acid; 4'-hydroxyphenyl-4-benzoic acid; 3'-hydroxyphenyl-4-benzoic acid; 4'-hydroxyphenyl-3-benzoic acid, etc., as well as alkyl, alkoxy, aryl and halogen substituents thereof, and combination thereof. One particularly suitable aromatic hydroxycarboxylic acid is 4-hydroxybenzoic acid ("HBA"). When employed, repeating units derived from hydroxycarboxylic acids (e.g., HBA) typically constitute from about 5 mol. % to about 80 mol. %, in some embodiments from about 10 mol. % to about 80 mol. %, and in some embodiments, from about 20 mol. % to about 70% of the polymer.

Other repeating units may also be employed in the polymer. In certain embodiments, for instance, repeating units may be employed that are derived from aromatic diols, such as hydroquinone, resorcinol, 2,6-dihydroxynaphthalene, 2,7-dihydroxynaphthalene, 1,6-dihydroxynaphthalene, 4,4'-dihydroxybiphenyl (or 4,4'-biphenol), 3,3'-dihydroxybiphenyl, 3,4'-dihydroxybiphenyl, 4,4'-dihydroxybiphenyl ether, bis(4-hydroxyphenyl)ethane, etc., as well as alkyl, alkoxy, aryl and halogen substituents thereof, and combinations thereof. Particularly suitable aromatic diols may include, for instance, hydroquinone ("HQ") and 4,4'-biphenol ("BP"). When employed, repeating units derived from aromatic diols (e.g., HQ and/or BP) typically constitute from about 1 mol. % to about 35 mol. %, in some embodiments from about 2 mol. % to about 30 mol. %, and in some embodiments, from about 5 mol. % to about 25% of the polymer. Repeating units may also be employed, such as those derived from aromatic amides (e.g., acetaminophen ("APAP")) and/or aromatic amines (e.g., 4-aminophenol ("AP"), 3-aminophenol, 1,4-phenylenediamine, 1,3-phenylenediamine, etc.). When employed, repeating units derived from aromatic amides (e.g., APAP) and/or aromatic amines (e.g., AP) typically constitute from about 0.1 mol. % to about 20 mol. %, in some embodiments from about 0.5 mol. % to about 15 mol. %, and in some embodiments, from about 1 mol. % to about 10% of the polymer. It should also be understood that various other monomeric repeating units may be incorporated into the polymer. For instance, in certain embodiments, the polymer may contain one or more repeating units derived from non-aromatic monomers, such as aliphatic or cycloaliphatic hydroxycarboxylic acids, dicarboxylic acids (e.g., cyclohexane dicarboxylic acid), diols, amides, amines, etc. Of course, in other embodiments, the polymer may be "wholly aromatic" in that it lacks repeating units derived from non-aromatic (e.g., aliphatic or cycloaliphatic) monomers.

In one particular embodiment, for example, the polymer may be formed from repeating units derived from HBA and TA and/or IA, as well as various other optional constituents. The repeating units derived from HBA may constitute from about 10 mol. % to about 80 mol. %, in some embodiments from about 30 mol. % to about 75 mol. %, and in some embodiments, from about 45 mol. % to about 70 mol. % of the polymer. The repeating units derived from TA and/or IA may likewise constitute from about 5 mol. % to about 40 mol. %, in some embodiments from about 10 mol. % to about 35 mol. %, and in some embodiments, from about 15 mol. % to about 35 mol. % of the polymer. Repeating units may also be employed that are derived from BP and/or HQ in an amount from about 1 mol. % to about 30 mol. %, in some embodiments from about 2 mol. % to about 25 mol. %, and in some embodiments, from about 5 mol. % to about 20 mol. % of the polymer. Other possible repeating units may include those derived from HNA, NDA, and/or APAP. For example, repeating units derived from HNA, NDA, and/or APAP may each constitute from about 1 mol. % to about 35 mol. %, in some embodiments from about 2 mol. % to about 30 mol. %, and in some embodiments, from about 3 mol. % to about 25 mol. % when employed.

Regardless of the particular constituents and nature of the polymer, the aromatic polyester may be prepared by initially introducing the aromatic monomer(s) used to form the ester repeating units (e.g., aromatic hydroxycarboxylic acid, aromatic dicarboxylic acid, etc.) and/or other repeating units (e.g., aromatic diol, aromatic amide, aromatic amine, etc.) into a reactor vessel to initiate a polycondensation reaction. The particular conditions and steps employed in such reactions are well known, and may be described in more detail in U.S. Pat. No. 4,161,470 to Calundann; U.S. Pat. No. 5,616,680 to Linstid, III, et al.; U.S. Pat. No. 6,114,492 to Linstid, III, et al.; U.S. Pat. No. 6,514,611 to Shepherd, et al.; and WO 2004/058851 to Waggoner. The vessel employed for the reaction is not especially limited, although it is typically desired to employ one that is commonly used in reactions of high viscosity fluids. Examples of such a reaction vessel may include a stirring tank-type apparatus that has an agitator with a variably-shaped stirring blade, such as an anchor type, multistage type, spiral-ribbon type, screw shaft type, etc., or a modified shape thereof. Further examples of such a reaction vessel may include a mixing apparatus commonly used in resin kneading, such as a kneader, a roll mill, a Banbury mixer, etc.

If desired, the reaction may proceed through the acetylation of the monomers as known the art. This may be accomplished by adding an acetylating agent (e.g., acetic anhydride) to the monomers. Acetylation is generally initiated at temperatures of about 90° C. During the initial stage of the acetylation, reflux may be employed to maintain vapor phase temperature below the point at which acetic acid byproduct and anhydride begin to distill. Temperatures during acetylation typically range from between 90° C. to 150° C., and in some embodiments, from about 110° C. to about 150° C. If reflux is used, the vapor phase temperature typically exceeds the boiling point of acetic acid, but remains low enough to retain residual acetic anhydride. For example, acetic anhydride vaporizes at temperatures of about 140° C. Thus, providing the reactor with a vapor phase reflux at a temperature of from about 110° C. to about 130° C. is particularly desirable. To ensure substantially complete reaction, an excess amount of acetic anhydride may be employed. The amount of excess anhydride will vary depending upon the particular acetylation conditions employed, including the presence or absence of reflux. The use of an excess of from about 1 to about 10 mole percent of acetic anhydride, based on the total moles of reactant hydroxyl groups present is not uncommon.

Acetylation may occur in in a separate reactor vessel, or it may occur in situ within the polymerization reactor vessel. When separate reactor vessels are employed, one or more of the monomers may be introduced to the acetylation reactor and subsequently transferred to the polymerization reactor.

Likewise, one or more of the monomers may also be directly introduced to the reactor vessel without undergoing pre-acetylation.

In addition to the monomers and optional acetylating agents, other components may also be included within the reaction mixture to help facilitate polymerization. For instance, a catalyst may be optionally employed, such as metal salt catalysts (e.g., magnesium acetate, tin(I) acetate, tetrabutyl titanate, lead acetate, sodium acetate, potassium acetate, etc.) and organic compound catalysts (e.g., N-methylimidazole). Such catalysts are typically used in amounts of from about 50 to about 500 parts per million based on the total weight of the recurring unit precursors. When separate reactors are employed, it is typically desired to apply the catalyst to the acetylation reactor rather than the polymerization reactor, although this is by no means a requirement.

The reaction mixture is generally heated to an elevated temperature within the polymerization reactor vessel to initiate melt polycondensation of the reactants. Polycondensation may occur, for instance, within a temperature range of from about 210° C. to about 400° C., and in some embodiments, from about 250° C. to about 350° C. For instance, one suitable technique for forming the aromatic polyester may include charging precursor monomers and acetic anhydride into the reactor, heating the mixture to a temperature of from about 90° C. to about 150° C. to acetylize a hydroxyl group of the monomers (e.g., forming acetoxy), and then increasing the temperature to a temperature of from about 210° C. to about 400° C. to carry out melt polycondensation. As the final polymerization temperatures are approached, volatile byproducts of the reaction (e.g., acetic acid) may also be removed so that the desired molecular weight may be readily achieved. The reaction mixture is generally subjected to agitation during polymerization to ensure good heat and mass transfer, and in turn, good material homogeneity. The rotational velocity of the agitator may vary during the course of the reaction, but typically ranges from about 10 to about 100 revolutions per minute ("rpm"), and in some embodiments, from about 20 to about 80 rpm. To build molecular weight in the melt, the polymerization reaction may also be conducted under vacuum, the application of which facilitates the removal of volatiles formed during the final stages of polycondensation. The vacuum may be created by the application of a suctional pressure, such as within the range of from about 5 to about 30 pounds per square inch ("psi"), and in some embodiments, from about 10 to about 20 psi.

Following melt polymerization, the molten polymer may be discharged from the reactor, typically through an extrusion orifice fitted with a die of desired configuration, cooled, and collected. Commonly, the melt is discharged through a perforated die to form strands that are taken up in a water bath, pelletized and dried. The resin may also be in the form of a strand, granule, or powder. While unnecessary, it should also be understood that a subsequent solid phase polymerization may be conducted to further increase molecular weight. When carrying out solid-phase polymerization on a polymer obtained by melt polymerization, it is typically desired to select a method in which the polymer obtained by melt polymerization is solidified and then pulverized to form a powdery or flake-like polymer, followed by performing solid polymerization method, such as a heat treatment in a temperature range of 200° C. to 350° C. under an inert atmosphere (e.g., nitrogen).

In still another embodiment, the semi-crystalline thermoplastic polymer can be a polyester polymer. The polyesters which are suitable for use herein are derived from an aliphatic or cycloaliphatic diol, or mixtures thereof, containing from 2 to about 10 carbon atoms and an aromatic dicarboxylic acid, i.e., polyalkylene terephthalates.

The polyesters which are derived from a cycloaliphatic diol and an aromatic dicarboxylic acid are prepared by condensing either the cis- or trans-isomer (or mixtures thereof) of, for example, 1,4-cyclohexanedimethanol with the aromatic dicarboxylic acid.

Examples of aromatic dicarboxylic acids include isophthalic or terephthalic acid, 1,2-di(p-carboxyphenyl)ethane, 4,4'-dicarboxydiphenyl ether, etc., and mixtures of these. All of these acids contain at least one aromatic nucleus. Fused rings can also be present such as in 1,4- or 1,5- or 2,6-naphthalene-dicarboxylic acids. In one embodiment, the dicarboxylic acid is terephthalic acid or mixtures of terephthalic and isophthalic acid.

Polyesters that may be used in the polymer composition, for instance, include polyethylene terephthalate, polybutylene terephthalate, mixtures thereof and copolymers thereof.

The polyester polymer or polybutylene terephthalate polymer can generally have a melt flow rate of greater than about 9 $cm^3/10$ min, such as greater than about 15 $cm^3/10$ min, such as greater than about 20 $cm^3/10$ min, and generally less than about 120 $cm^3/10$ min, such as less than about 100 $cm^3/10$ min, such as less than about 70 $cm^3/10$ min, such as less than about 50 $cm^3/10$ min, when tested at 250° C. and at a load of 2.16 kg.

In still another embodiment, the semi-crystalline thermoplastic polymer can be a polyamide. Polyamides are thermoplastic polymers having repeat amide groups in the main chain. They encompass not only homopolymers of amino carboxylic acid type but also those of the diamine dicarboxylic acid type and also copolymers with other comonomers.

Examples of polyamides are polyhexamethyleneadipamide, poly-hexamethyleneazelamide, polyhexamethylenesebacamide, polyhexa-methylenedodecanediamide, poly-11-aminoundecanamide, and bis(p-aminocyclohexyl) methanedodecanediamide, or the products obtained via ring-opening of lactams, e.g. polycaprolactam or polylaurolactam. Other suitable polyamides are those based on terephthalic or isophthalic acid as acid component and/or trimethylhexamethylenediamine or bis(p-amino-cyclohexyl)propane as diamine component, and also polyamide parent resins prepared via copolymerization of two or more of the abovementioned polymers or their components. An example that may be mentioned of these is a copolycondensate composed of terephthalic acid, isophthalic acid, hexamethylenediamine, and caprolactam.

In accordance with the present disclosure, the semi-crystalline thermoplastic polymer is combined with at least one laser activatable additive. The laser activatable additive is included in the composition in an amount sufficient for the composition to be amenable to laser marking in order to create patterns that can cover substantial portions of the surface area of molded articles made from the polymer composition. The laser activatable additive can vary depending upon the particular application and the desired result. The laser activatable additive can be a coloring agent that adds color to the polymer composition. The laser activatable additive can be used alone as the coloring agent or in combination with other coloring agents. Other coloring agents, for instance, may not be laser activatable but interact with the laser activatable additive in a way that alters a color component of the polymer composition when exposed to high energy light. such as a laser beam.

In one embodiment, the laser activatable additive comprises a metal oxide. For example, in one embodiment, the laser activatable additive may comprise a tin oxide, particularly an antimony-doped tin oxide.

The metal oxide may comprise a coating that has been applied to particles, particularly plate-like particles. For instance, in one embodiment, the laser activatable additive comprises plate-like particles coated with a metal oxide as described above. The plate-like particles, for instance, may have an aspect ratio of greater than 2, such as greater than 5, such as greater than 10. The aspect ratio is generally less than about 60, such as less than about 50. In general, any suitable plate-like particle may be used. For instance, in one embodiment, the plate-like particle comprises mica.

In one embodiment, the metal oxide can be in the form of particles that are embedded in a polymer matrix. For instance, in one embodiment, antimony trioxide can embedded in a thermoplastic matrix that comprises polyethylene. The antimony trioxide can be present in each encapsulated particle in an amount from about 60% to about 80% by weight. The particles can have a white color and can be in the form of granules.

In an alternative embodiment, the laser activatable additive may comprise a metal hydroxide, such as a metal dihydroxide. For instance, in one embodiment, the laser activatable additive may comprise a copper dihydroxide. In one particular embodiment, the laser activatable additive may comprise copper hydroxide phosphate.

In one embodiment, the laser activatable additive can be a black pigment. Black pigment, for instance, can be a bone black pigment which is produced by the destructive distillation of animal bones in the absence of oxygen to form bone char. The bone char can have an average particle size of from about 0.3 microns to about 50 microns. The bone black pigment can comprise from about 10% to about 20% by weight carbon and from about 90% to about 80% by weight calcium phosphate. Once exposed to laser light, bone char pigment can change in color, such as to a white color.

In still another embodiment, the polymer composition can contain a titanium dioxide pigment. The titanium dioxide pigment can be laser activatable or can be laser non-activatable. In one embodiment, the titanium dioxide pigment is a rutile pigment in which the particles have been surface treated with aluminum and/or polysiloxane compounds.

In one embodiment, the laser activatable additive can comprise a metallic pigment. Metallic pigments that may be used include an iron pigment, an iron alloy pigment, an aluminum pigment, a copper pigment, a nickel pigment, a silver pigment, a zinc pigment, a brass pigment, and combinations thereof.

The metallic pigment may comprise particles having any suitable shape. For instance, the particles may comprise plate-like shaped particles, such as flakes, fibers, and the like. In one embodiment, for instance, plate-like particles may be used.

The plate-like particles can have an aspect ratio of greater than about 4:1, such as greater than about 8:1, such as from about 10:1 to about 50:1. The plate-like particles can have a median diameter of generally greater than about 12 microns, such as greater than about 14 microns. The plate-like particles can have a median diameter of generally less than about 25 microns, such as less than about 20 microns.

In one embodiment, the metallic pigment may comprise an aluminum pigment that contains elemental aluminum. The aluminum pigment, for instance, can be very thin having a thickness of less than about 1 micron and can have a median diameter as described above. In one particular embodiment, for instance, the aluminum pigment may have a median diameter of from about 12 microns to about 18 microns. The aluminum pigment can have a pronounced flop.

In one embodiment, the metal pigment can contain greater than about 80% by weight metal. The metal pigment can be present alone or in combination with other additives, such as a carrier. For instance, the metal pigment may be present in combination with a thermoplastic polymer, such as a polyolefin, a purified medical white oil, or may be present with a solvent, such as di-isononyl-phtalate.

In still another embodiment, the laser activatable additive can comprise at least one particulate light-sensitive compound of a salt type which when exposed to laser light changes its color or leads to a color change in the plastic, and which contains two or more cations of which one is selected from the group consisting of: Ti, Cr, Mn, Fe, Co, Ni, Cu, Zn, Y, Zr, Nb, Mo, Ag, Sn, Sb, La, Pr, Ta, W, Ce, and of which another is selected from the group consisting of: elements of the 3rd-6th Periods of main group II and III, the 5th-6th Periods of main group IV, or else the 4th-5th Periods of transition group III-VIII of the Periodic Table of the Elements, or of the lanthanoids.

In still another embodiment, the laser activatable additive may include spinal crystals. To help accomplish these functions, the laser activatable additive may include spinel crystals, which may include two or more metal oxide cluster configurations within a definable crystal formation. For example, the overall crystal formation may have the following general formula:

$$AB_2O_4$$

wherein,

A is a metal cation having a valance of 2, such as cadmium, chromium, manganese, nickel, zinc, copper, cobalt, iron, magnesium, tin, palladium, titanium, etc., as well as combinations thereof; and B is a metal cation having a valance of 3, such as chromium, iron, aluminum, nickel, manganese, tin, etc., as well as combinations thereof.

Typically, A in the formula above provides the primary cation component of a first metal oxide cluster and B provides the primary cation component of a second metal oxide cluster. These oxide clusters may have the same or different structures. In one embodiment, for example, the first metal oxide cluster has a tetrahedral structure and the second metal oxide cluster has an octahedral cluster. Regardless, the clusters may together provide a singular identifiable crystal type structure having heightened susceptibility to electromagnetic radiation. Examples of suitable spinel crystals include, for instance, $MgAl_2O_4$, $ZnAl_2O_4$, $FeAl_2O_4$, $CuFe_2O_4$, $CuCr_2O_4$, $MnFe_2O_4$, $NiFe_2O_4$, $TiFe_2O_4$, $FeCr_2O_4$, $MgCr_2O_4$, etc. Copper chromium oxide ($CuCr_2O_4$), also known as copper chromite, is particularly suitable for use in the present invention.

One or more laser activatable additives can be present in the polymer composition in relatively minor amounts. For instance, one or more laser activatable additives can be present in the polymer composition in an amount less than about 2% by weight, such as in an amount less than about 1.5% by weight, such as in an amount less than about 1% by weight, such as in an amount less than about 0.5% by weight, such as in an amount less than about 0.3% by weight, such as in an amount less than about 0.2% by weight. One or more laser activatable additives are present in the polymer composition generally in an amount greater than about 0.001% by weight, such as in an amount greater than about 0.01% by weight, such as in an amount greater than about 0.08% by weight.

In addition to one or more laser activatable additives, the polymer composition of the present disclosure can also contain coloring agents that may not be reactive to laser light. In general, any suitable coloring agent can be incorporated into the polymer composition in order to obtain a desired color, shade, hue, or the like.

Coloring agents that may be used include any desired inorganic pigments, such as titanium dioxide, ultramarine blue, cobalt blue, and other organic pigments and dyes, such as phthalocyanines, anthraquinones, and the like. Other coloring agents include carbon black or various other polymer-soluble dyes. The colorants can generally be present in the composition in an amount up to about 2 percent by weight.

The polymer composition can also contain various other components and additives. For example, in one embodiment, the polymer composition may contain reinforcing fibers. Reinforcing fibers include mineral fibers, such as glass fibers, polymer fibers, in particular organic high-modulus fibers, such as aramid fibers, or metal fibers, such as steel fibers, or carbon fibers or natural fibers, or fibers from renewable resources.

The fibers may be in modified or unmodified form, e.g. provided with a sizing, or chemically treated, in order to improve adhesion to the plastic. Glass fibers are particularly preferred.

Glass fibers can be provided with a sizing to protect the glass fiber, to smooth the fiber but also to improve the adhesion between the fiber and the matrix material. A sizing usually comprises silanes, film forming agents, lubricants, wetting agents, adhesive agents optionally antistatic agents and plasticizers, emulsifiers, and optionally further additives.

Specific examples of silanes are aminosilanes, e.g. 3-trimethoxysilylpropylamine, N-(2-aminoethyl)-3-aminopropyltrimethoxy-silane, N-(3-trimethoxysilanylpropyl)ethane-1,2-diamine, 3-(2-aminoethyl-amino)propyltrimethoxysilane, N-[3-(trimethoxysilyl)propyl]-1,2-ethane-diamine.

Film forming agents are for example polyvinylacetates, polyesters and polyurethanes. Sizings based on polyurethanes may be used advantageously.

The reinforcing fibers may be compounded into the polymer matrix, for example in an extruder or kneader.

According to one embodiment, the polymer composition of the present disclosure comprises at least one reinforcing fiber which is a mineral fiber, preferably a glass fiber, more preferably a coated or impregnated glass fiber. Glass fibers which are suitable for the molding composition of the present disclosure are commercially available, e.g. Johns Manville, ThermoFlow®Chopped Strand 753, OCV Chopped Strand 408 A, Nippon Electric Glass Co. (NEG) Chopped Strand T-651.

Fiber diameters can vary depending upon the particular fiber used and whether the fiber is in either a chopped or a continuous form. The fibers, for instance, can have a diameter of from about 5 μm to about 100 μm, such as from about 5 μm to about 50 μm, such as from about 5 μm to about 15 μm. The length of the fibers can vary depending upon the particular application. For instance, the fibers can have an average length of greater than about 100 microns, such as greater than about 500 microns, such as greater than about 1,000 microns, such as greater than about 2,000 microns. The length of the fibers can generally be less than about 5,000 microns, such as less than about 4,500 microns, such as less than about 4,000 microns, such as less than about 3,500 microns.

Reinforcing fibers can be present in the polymer composition generally in an amount from about 5% to about 55% by weight, including all increments of 1% by weight therebetween. For example, reinforcing fibers, such as glass fibers, can be present in the polymer composition in an amount greater than about 10% by weight, such as in an amount greater than about 15% by weight, such as in an amount greater than about 18% by weight. The reinforcing fibers are generally present in an amount less than about 50% by weight, such as in an amount less than about 40% by weight, such as in an amount less than about 35% by weight, such as in an amount less than about 33% by weight.

In addition to fibers, one or more fillers may also be incorporated into the polymer composition. The filler may comprise a metallic powder, mineral particles, glass beads, polytetrafluoroethylene particles, graphite, boron nitride, metal oxide particles, metal carbonate particles or mixtures thereof. The filler can generally be present in the polymer composition in an amount from about 5% to about 40% by weight.

The polymer composition may also contain one or more lubricants. Amide waxes, for instance, may be employed that are formed by reaction of a fatty add with a monoamine or diamine (e.g., ethylenediamine) having 2 to 18, especially 2 to 8, carbon atoms. For example, ethylenebisamide wax, which is formed by the amidization reaction of ethylene diamine and a fatty add, may be employed. The fatty add may be in the range from $C_{12}$ to $C_{30}$, such as from stearic add ($C_{18}$ fatty add) to form ethylenebisstearamide wax. In one aspect, the ethylenebisstearamide wax has a discrete melt temperature of 142° C. Other ethylenebisamides include the bisamides formed from lauric add, palmitic add, oleic acid, linoleic add, linolenic add, oleostearic add, myristic add and undecalinic add. SUM other suitable amide waxes are N-(2-hydroxyethyl)12-hydroxystearamide and N,N'-(ethylene bis)12-hydroxystearamide.

In one embodiment, the lubricant can serve as a mold release agent and can comprise a fatty acid ester. In one particular embodiment, for instance, the composition can contain fatty acid esters that are derived from montanic acids, such as esters of a montanic acid in combination with a polyol.

One or more lubricants can be present in the polymer composition generally in an amount greater than about 0.05% by weight, such as in an amount greater than about 0.1% by weight, such as in an amount greater than about 0.2% by weight, such as in an amount greater than about 0.25% by weight. One or more lubricants are generally present in an amount less than about 2% by weight, such as in an amount less than about 1.8% by weight, such as in an amount less than about 0.9% by weight.

The polymer composition can also contain an impact modifier. Examples of impact modifiers that may be incorporated into the composition include thermoplastic elastomers, a methacrylate butadiene styrene, a styrene acrylonitrile, and mixtures thereof. In one aspect, the impact modifier can be a core and shell impact modifier. Combinations of different impact modifiers may be used in order to enhance various properties of the polymer composition or of articles made from the composition. For example, the polymer composition can contain two or more thermoplastic elastomers.

Various different thermoplastic elastomers may be used as the impact modifier. Thermoplastic elastomers well suited for use in the present disclosure are polyester elastomers (TPE-E), thermoplastic polyamide elastomers (TPE-A) and in particular thermoplastic polyurethane elastomers (TPE-U). The above thermoplastic elastomers have active hydrogen atoms which can be reacted with a coupling reagent and/or the polyoxymethylene polymer. Examples of such groups are urethane groups, amido groups, amino groups or hydroxyl groups. For instance, terminal polyester diol flexible segments of thermoplastic polyurethane elastomers have hydrogen atoms which can react, for example, with isocyanate groups.

In one embodiment, the thermoplastic elastomer may comprise a thermoplastic polyester elastomer. The thermoplastic polyester elastomer can be, for instance, a thermoplastic copolyester elastomer that comprises a thermoplastic ester ether elastomer. In one aspect, the thermoplastic polyester elastomer can be a thermoplastic copolyester elastomer that comprises a block copolymer of polybutylene terephthalate and polyether segments.

In one aspect, the thermoplastic polyester elastomer can be a block copolymer of polybutylene terephthalate and polyether segments and can have a structure as follows:

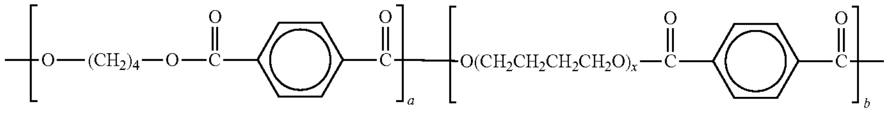

Hard segment (PBT)

Soft Segment
(Polytetramethylene Ether Glycol Terephtalate)

wherein a and b are integers and can vary from 2 to 10,000. The ratio between hard and soft segments in the block copolymer as described above can be varied in order to vary the properties of the elastomer. In one aspect, the density of the polyester elastomer as indicated above can be from about 1.05 g/cm$^3$ to about 1.15 g/cm$^3$, such as from about 1.08 g/cm$^3$ to about 1.1 g/cm$^3$.

In an alternative embodiment, the impact modifier may comprise a non-aromatic polymer, which refers to a polymer that does not include any aromatic groups on the backbone of the polymer. Such polymers include acrylate polymers and/or graft copolymers containing an olefin. For instance, an olefin polymer can serve as a graft base and can be grafted to at least one vinyl polymer or one ether polymer. In still another embodiment, the graft copolymer can have an elastomeric core based on polydienes and a hard or soft graft envelope composed of a (meth)acrylate and/or a (meth) acrylonitrile.

Examples of impact modifiers as described above include ethylene-acrylic acid copolymer, ethylene-maleic anhydride copolymers, ethylene-alkyl(meth)acrylate-maleic anhydride terpolymers, ethylene-alkyl(meth)acrylate-glycidyl(meth) acrylate terpolymers, ethylene-acrylic ester-methacrylic acid terpolymer, ethylene-acrylic ester-maleic anhydride terpolymer, ethylene-methacrylic acid-methacrylic acid alkaline metal salt (ionomer) terpolymers, and the like. In one embodiment, for instance, the impact modifier can include a random terpolymer of ethylene, methylacrylate, and glycidyl methacrylate. The terpolymer can have a glycidyl methacrylate content of from about 5% to about 20%, such as from about 6% to about 10%. The terpolymer may have a methylacrylate content of from about 20% to about 30%, such as about 24%.

The impact modifier may be a linear or branched, homopolymer or copolymer (e.g., random, graft, block, etc.) containing epoxy functionalization, e.g., terminal epoxy groups, skeletal oxirane units, and/or pendent epoxy groups. For instance, the impact modifier may be a copolymer including at least one monomer component that includes epoxy functionalization. The monomer units of the impact modifier may vary. For example, the impact modifier can include epoxy-functional methacrylic monomer units. As used herein, the term methacrylic generally refers to both acrylic and methacrylic monomers, as well as salts and esters thereof, e.g., acrylate and methacrylate monomers. Epoxy-functional methacrylic monomers as may be incorporated in the impact modifier may include, but are not limited to, those containing 1,2-epoxy groups, such as glycidyl acrylate and glycidyl methacrylate. Other suitable epoxy-functional monomers include allyl glycidyl ether, glycidyl ethacrylate, and glycidyl itoconate.

Examples of other monomers may include, for example, ester monomers, olefin monomers, amide monomers, etc. In one embodiment, the impact modifier can include at least one linear or branched α-olefin monomer, such as those having from 2 to 20 carbon atoms, or from 2 to 8 carbon atoms. Specific examples include ethylene; propylene; 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene.

In one embodiment, the impact modifier can be a terpolymer that includes epoxy functionalization. For instance, the impact modifier can include a methacrylic component that includes epoxy functionalization, an α-olefin component, and a methacrylic component that does not include epoxy functionalization. For example, the impact modifier may be poly(ethylene-co-methylacrylate-co-glycidyl methacrylate), which has the following structure:

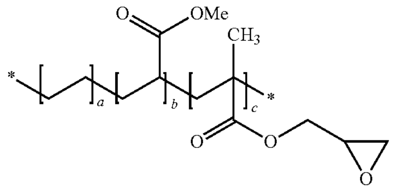

wherein, a, b, and c are 1 or greater.

In another embodiment the impact modifier can be a random copolymer of ethylene, ethyl acrylate and maleic anhydride having the following structure:

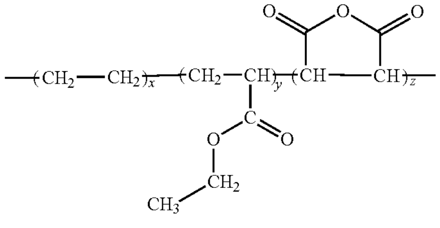

wherein x, y and z are 1 or greater.

The relative proportion of the various monomer components of a copolymeric impact modifier is not particularly limited. For instance, in one embodiment, the epoxy-functional methacrylic monomer components can form from about 1 wt. % to about 25 wt. %, or from about 2 wt. % to about 20 wt % of a copolymeric impact modifier. An α-olefin monomer can form from about 55 wt. % to about 95 wt. %, or from about 60 wt. % to about 90 wt. %, of a copolymeric impact modifier. When employed, other monomeric components (e.g., a non-epoxy functional methacrylic monomers) may constitute from about 5 wt. % to about 35 wt. %, or from about 8 wt. % to about 30 wt. %, of a copolymeric impact modifier.

The molecular weight of the above impact modifier can vary widely. For example, the impact modifier can have a number average molecular weight from about 7,500 to about 250,000 grams per mole, in some embodiments from about 15,000 to about 150,000 grams per mole, and in some embodiments, from about 20,000 to 100,000 grams per mole, with a polydispersity index typically ranging from 2.5 to 7.

In general, one or more impact modifiers may be present in the polymer composition in an amount from about 4% by weight to about 27% by weight, including all increments of 1% by weight therebetween. For instance, one or more impact modifiers can be present in the polymer composition in an amount greater than about 6% by weight, such as in an amount greater than about 8% by weight, such as in an amount greater than about 10% by weight, such as in an amount greater than about 12% by weight, such as in an amount greater than about 14% by weight, such as in an amount greater than about 16% by weight, and generally in an amount less than about 25% by weight, such as in an amount less than about 23% by weight.

The polymer composition can also contain various stabilizers, including light stabilizers, heat stabilizers and the like. In one embodiment, for instance, the composition can contain a phenolic antioxidant. Examples of such phenolic antioxidants include, for instance, calcium bis(ethyl 3,5-di-tert-butyl-4-hydroxybenzylphosphonate) (Irganox® 1425); terephthalic add, 1,4-dithio-,S,S-bis(4-tert-butyl-3-hydroxy-2,6-dimethylbenzyl) ester (Cyanox® 1729); triethylene glycol bis(3-test-butyl-4-hydroxy-5-methylhydrocinnamate); hexamethylene bis(3,5-di-tert-butyl-4-hydroxyhydrocinnamate (Irganox® 259); 1,2-bis(3,5,di-tert-butyl-4-hydroxyhydrocinnamoyl)hydrazide (Irganox® 1024); 4,4'-di-tert-octyldiphenamine (Naugalube® 438R); phosphonic acid, (3,5-di-tert-butyl-4-hydroxybenzyl)-, dioctadecyl ester (Irganox® 1093); 1,3,5-trimethyl-2,4,6-tris(3',5'-di-tert-butyl-4" hydroxybenzyl)benzene (Irganox® 1330); 2,4-bis (octylthio)-6-(4-hydroxy-3,5-di-tert-butylanilino)-1,3,5-triazine (Irganox® 565); isooctyl 3-(3,5-di-tert-butyl-4-hydroxyphenyl)propionate (Irganox® 1135); octadecyl 3-(3, 5-di-tert-butyl-4-hydroxyphenyl)propionate (Irganox® 1076); 3,7-bis(1,1,3,3-tetramethylbutyl)-10H-phenothiazine (Irganox® LO 3); 2,2'-methylenebis(4-methyl-6-tert-butylphenol)monoacrylate (Irganox® 3052); 2-tert-butyl-6-[1-(3-tert-butyl-2-hydroxy-5-methylphenyl)ethyl]-4-methylphenyl acrylate (Sumilizer™ 4039); 2-[1-(2-hydroxy-3,5-di-tert-pentylphenyl)ethyl]-4,6-di-tert-pentylphenyl acrylate (Sumilizer® GS); 1,3-dihydro-2H-Benzimidazole (Sumilizer® MB); 2-methyl-4,6-bis[(octylthio)methyl]phenol (Irganox® 1520); N,N'-trimethylenebis-[3-(3,5-di-tert-butyl-4-hydroxyphenyl)propionamide (Irganox® 1019); 4-n-octadecyloxy-2,6-diphenylphenol (Irganox® 1063); 2,2'-ethylidenebis[4,6-di-tert-butylphenol] (Irganox® 129); N N'-hexamethylenebis(3,5-di-tert-butyl-4-hydroxyhydrocinnamamide) (Irganox® 1098); diethyl (3,5-di-tert-butyl-4-hydroxybenxyl)phosphonate (Irganox® 1222); 4,4'-di-tert-octyldiphenylamine (Irganox® 5057); N-phenyl-1-napthalenamine (Irganox® L 05); tris[2-tert-butyl-4-(3-ter-butyl-4-hydroxy-6-methylphenylthio)-5-methyl phenyl] phosphite (Hostanox® OSP 1); zinc dinonyidithiocarbamate (Hostanox® VP-ZNCS 1); 3,9-bis[1,1-dimethyl-2-[(3-tert-butyl-4-hydroxy-5-methylphenyl)propionyloxy]ethyl]-2,4, 8,10-tetraoxaspiro[5,5]undecane (Sumilizer® AG80); pentaerythrityl tetrakis[3-(3,5-di-tert-butyl-4-hydroxyphenyl) propionate] (Irganox® 1010); ethylene-bis(oxyethylene)bis [3-(5-tert-butyl-4-hydroxy-m-tolyl)-propionate (Irganox® 245); 3,5-di-tert-butyl-4-hydroxytoluene (Lowinox BHT, Chemtura) and the like.

One type of stabilizer that may be included in the polyester composition are hindered amine light stabilizers ("HALS"). Suitable HALS compounds may be derived from a substituted piperidine, such as alkyl-substituted piperidyl, piperidinyl, piperazinone, alkoxypiperidinyl compounds, and so forth. For example, the hindered amine may be derived from a 2,2,6,6-tetraalkylpiperidinyl. Regardless of the compound from which it is derived, the hindered amine is typically an oligomeric or polymeric compound having a number average molecular weight of about 1,000 or more, in some embodiments from about 1000 to about 20,000, in some embodiments from about 1500 to about 15,000, and in some embodiments, from about 2000 to about 5000. Such compounds typically contain at least one 2,2,6,6-tetraalkylpiperidinyl group (e.g., 1 to 4) per polymer repeating unit.

Without intending to be limited by theory, it is believed that high molecular weight hindered amines are relatively thermostable and thus able to inhibit light degradation even after being subjected to extrusion conditions. One particularly suitable high molecular weight hindered amine has the following general structure:

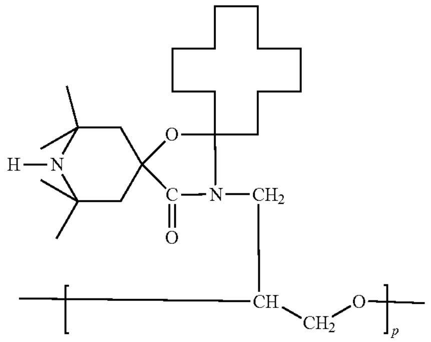

wherein, p is 4 to 30, in some embodiments 4 to 20, and in some embodiments 4 to 10. This oligomeric compound is commercially available from Clariant under the designation Hostavin® N30 and has a number average molecular weight of 1200.

Another suitable high molecular weight hindered amine has the following structure:

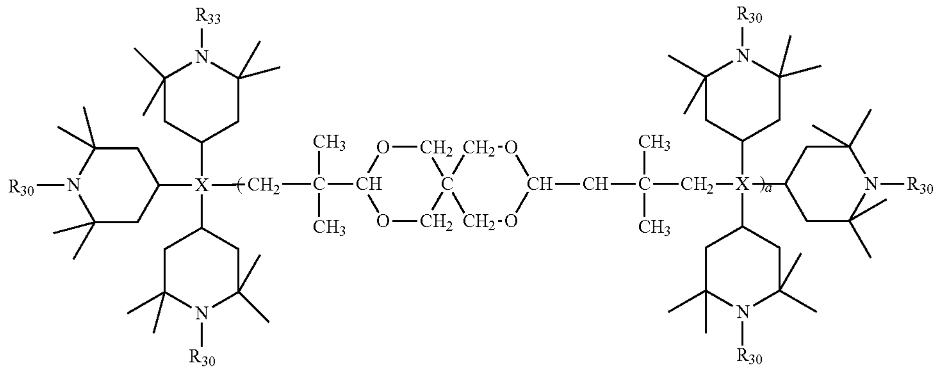

wherein, n is from 1 to 4 and R30 is independently hydrogen or $CH_3$. Such oligomeric compounds are commercially available from Adeka Palmarole SAS (joint venture between Adeka Corp. and Palmarole Group) under the designation ADK STAB® LA-63 (R30 is $CH_3$) and ADK STAB® LA-68 (R30 is hydrogen).

Other examples of suitable high molecular weight hindered amines include, for instance, an oligomer of N-(2-hydroxyethyl)-2,2,6,6-tetramethyl-4-piperidinol and succinic acid (Tinuvin® 622 from Ciba Specialty Chemicals, MW=4000); oligomer of cyanuric acid and N,N-di(2,2,6,6-tetramethyl-4-piperidyl)-hexamethylene diamine; poly((6-morpholine-S-triazine-2,4-diyl)(2,2,6,6-tetramethyl-4-piperidinyl)-iminohexamethylene-(2,2,6,6-tetramethyl-4-piperidinyl)-imino) (Cyasorb® UV 3346 from Cytec, MW=1600); polymethylpropyl-3-oxy-[4(2,2,6,6-tetramethyl)-piperidinylysiloxane (Uvasil® 299 from Great Lakes Chemical; MW=1100 to 2500); copolymer of α-methylstyrene-N-(2,2,6,6-tetramethyl-4-piperidinyl)maleimide and N-stearyl maleimide; 2,4,8,10-tetraoxaspiro[5.5]undecane-3,9-diethanol tetramethyl-polymer with 1,2,3,4-butanetetracarboxylic acid; and so forth. Still other suitable high molecular weight hindered amines are described in U.S. Pat. No. 5,679,733 to Malik, et al. and 6,414,155 to Sassi, et al., which are incorporated herein in their entirety by reference thereto for all purposes.

In addition to the high molecular hindered amines, low molecular weight hindered amines may also be employed in the composition. Such hindered amines are generally monomeric in nature and have a molecular weight of about 1000 or less, in some embodiments from about 155 to about 800, and in some embodiments, from about 300 to about 800.

Specific examples of such low molecular weight hindered amines may include, for instance, bis-(2,2,6,6-tetramethyl-4-piperidyl) sebacate (Tinuvin® 770 from Ciba Specialty Chemicals, MW=481); bis-(1,2,2,6,6-pentamethyl piperidinyl)-(3,5-ditert.butyl-4-hydroxybenzyl)butyl-propane dioate; bis-(1,2,2,6,6-pentamethyl-4-piperidinyl)sebacate; 8-acetyl-3-dodecyl-7,7,9,9-tetramethyl-1,3,8-triazaspiro-(4,5)-decane-2,4-dione, butanedioic acid-bis-(2,2,6,6-tetramethyl-4-piperidinyl) ester; tetrakis-(2,2,6,6-tetramethyl-4-piperidyl)-1,2,3,4-butane tetracarboxylate; 7-oxa-3,20-diazadispiro(5.1.11.2) heneicosan-20-propanoic acid, 2,2,4,4-tetramethyl-21-oxo, dodecyl ester; N-(2,2,6,6-tetramethyl-4-piperidinyl)-N'-amino-oxamide; o-t-amyl-o-(1,2,2,6,6-pentamethyl-4-piperidinyl)-monoperoxicarbonate; β-alanine, N-(2,2,6,6-tetramethyl-4-piperidinyl), dodecylester; ethanediamide, N-(1-acetyl-2,2,6,6-tetramethylpiperidinyl)-N'-dodecyl; 3-dodecyl-1-(2,2,6,6-tetramethyl-4-piperidinyl)-pyrrolidin-2,5-dione; 3-dodecyl-1-(1,2,2,6,6-pentamethyl-4-piperidinyl)-pyrrolidin-2,5-dione; 3-dodecyl-1-(1-acetyl,2,2,6,6-tetramethyl-4-piperidinyl)-pyrrolidin-2,5-dione, (Sanduvar® 3058 from Clariant, MW=448.7); 4-benzoyloxy-2,2,6,6-tetramethylpiperidine; 1-[2-(3,5-di-tert-butyl-4-hydroxyphenylpropionyloxy)ethyl]-4-(3,5-di-tert-butyl-4-hydroxylphenyl propionyloxy)-2,2,6,6-tetramethyl-piperidine; 2-methyl-2-(2",2",6",6"-tetramethyl-4"-piperidinylamino)-N-(2',2',6',6'-tetramethyl-4"-piperidinyl)propionylamide; 1,2-bis-(3,3,5,5-tetramethyl-2-oxo-piperazinyl)ethane; 4-oleoyloxy-2,2,6,6-tetramethylpiperidine, and combinations thereof. Other suitable low molecular weight hindered amines are described in U.S. Pat. No. 5,679,733 to Malik, et al.

The hindered amines may be employed singularly or in combination in any amount to achieve the desired properties, but typically constitute from about 0.01 wt. % to about 4 wt. % of the polymer composition.

UV absorbers, such as benzotriazoles or benzopheones, may be employed in the composition to absorb ultraviolet light energy. Suitable benzotriazoles may include, for instance, 2-(2-hydroxyphenyl)benzotriazoles, such as 2-(2-hydroxy-5-methylphenyl)benzotriazole; 2-(2-hydroxy-5-tert-octylphenyl)benzotriazole (Cyasorb® UV 5411 from Cytec); 2-(2-hydroxy-3,5-di-tert-butylphenyl)-5-chlorobenzo-triazole; 2-(2-hydroxy-3-tert-butyl-5-methylphenyl)-5-chlorobenzotriazole, 2-(2-hydroxy-3,5-dicumylphenyl)benzotriazole; 2,2'-methylenebis(4-tert-octyl-6-benzotriazolylphenol); polyethylene glycol ester of 2-(2-hydroxy-3-tert-butyl-5-carboxyphenyl)benzotriazole; 2-[2-hydroxy-3-(2-acryloyloxyethyl)-5-methylphenyl]-benzotriazole; 2-[2-hydroxy-3-(2-methacryloyloxyethyl)-5-tert-butylphenyl]benzotriazole; 2-[2-hydroxy-3-(2-methacryloyloxyethyl)-5-tert-octylphenyl]benzotriazole; 2-[2-hydroxy-3-(2-methacryloyloxyethyl)-5-tert-butylphenyl]-5-chlorobenzotriazole; 2-[2-hydroxy-5-(2-methacryloyloxyethyl)phenyl]benzotriazole; 2-[2-hydroxy-3-tert-butyl-5-(2-methacryloyloxyethyl)phenyl] benzotriazole; 2-[2-hydroxy-3-tert-amyl-5-(2-methacryloyloxyethyl)phenyl]benzotriazole; 2-[2-hydroxy-3-tert-butyl-5-(3-methacryloyloxypropyl)phenyl]-5-chlorobenzotriazole; 2-[2-hydroxy-4-(2-methacryloyloxymethyl)phenyl]benzotriazole; 2-[2- hydroxy-4-(3-methacryloyloxy-2-hydroxypropyl)phenyl] benzotriazole; 2-[2-hydroxy-4-(3-methacryloyloxypropyl) phenyl]benzotriazole; and combinations thereof.

Exemplary benzophenone light stabilizers may likewise include 2-hydroxy-4-dodecyloxybenzophenone; 2,4-dihydroxybenzophenone; 2-(4-benzoyl-3-hydroxyphenoxy) ethyl acrylate (Cyasorb® UV 209 from Cytec); 2-hydroxy-4-n-octyloxy)benzophenone (Cyasorb® 531 from Cytec); 2,2'-dihydroxy-4-(octyloxy)benzophenone (Cyasorb® UV 314 from Cytec); hexadecyl-3,5-bis-tert-butyl-4-hydroxybenzoate (Cyasorb® UV 2908 from Cytec); 2,2'-thiobis(4-tert-octylphenolato)-n-butylamine nickel(II) (Cyasorb® UV 1084 from Cytec); 3,5-d-tert-butyl-4-hydroxybenzoic add, (2,4-di-tert-butylphenyl)ester (Cyasorb® 712 from Cytec); 4,4'-dimethoxy-2,2'-dihydroxybenzophenone (Cyasorb® UV 12 from Cytec); and combinations thereof.

When employed, UV absorbers may constitute from about 0.01 wt. % to about 4 wt. % of the entire polymer composition.

Once the polymer composition is formulated, the composition can be molded into a shaped part or article for use in a wide variety of different applications. For example, the shaped part may be molded using an injection molding process. In addition, parts and articles can be melt processed in other ways including extrusion, blow molding, thermoforming, and the like.

Once the article is molded, a pattern is formed on the facing surface of the article. The pattern can be formed using laser light that causes a visible pattern to form. The one or more laser activatable additives, the one or more coloring agents present in the polymer composition, and the matrix polymer in combination with the duration and intensity of the laser light can be used to create patterns that have little contrast with the background matrix color or can be designed to have a greater contrast with the background color.

The regions of wavelength of the laser light used are not in principle subject to any restrictions. The wavelength of suitable lasers is generally in the range from 157 nm to 10.6 μm, preferably in the range from 532 nm to 10.6 μm.

By way of example, mention may be made here of $CO_2$ lasers (10.6 μm) and Nd:YAG lasers (1064 nm), or pulsed UV lasers.

The wavelengths of typical excimer lasers are as follows: F2 excimer lasers (157 nm), ArF excimer lasers (193 nm), KrCl excimer lasers (222 nm), KrF excimer lasers (248 nm, XeCl excimer lasers (308 nm), XeF excimer lasers (351 nm), frequency-multiplied Nd:YAG lasers with wavelengths of 532 nm (frequency-doubled), of 355 nm (frequency-tripled), or 265 nm (frequency-quadrupled).

It is particularly preferable to use Nd:YAG lasers (1064 or 532 nm) and $CO_2$ lasers.

The energy densities of the lasers used in the invention are generally in the range from 0.3 $mJ/cm^2$ to 50 $J/cm^2$, preferably from 0.3 $mJ/cm^2$ to 10 $J/cm^2$. If pulsed lasers are used, the pulse frequency is generally in the range from 1 to 30 kHz.

In one embodiment, the pattern applied to the facing surface of the molded article can be created digitally. A controller, such as a computer, can then control one or more lasers for forming the pattern into the surface of the molded article.

The pattern formed into the surface of the molded article can have different surface characteristics than the surrounding molded matrix polymer. For instance, the pattern can have a coefficient of friction that is greater than the background surface creating a molded article with a unique tactile feel, which can be especially useful when designing handles.

The difference in appearance between the laser-marked pattern and the surrounding background can vary depending upon the particular application. The difference between the laser-marked pattern and the surrounding background, for instance, can be based on color and/or can be based on gloss characteristics. Differences in color can be measured using the CIELab color scale.

As used herein, CIELab color values L*, a*, and b* are measured according to the color space specified by the International Commission on Illumination. The L*a*b* colourimetric system was standardized in 1976 by Commission Internationale de l'Eclairage (CIE). The CIELab L* value, utilized herein to define the darkness/lightness of the polymer composition, is a unit of colour measurement in the afore-mentioned CIELab system. A colour may be matched according to CIELab. In the L*a*b* colourimetric system, L* refers to lightness expressed by a numerical value of from 0 to 100, in which L*=0 means that the colour is complete black, and L*=100 means that the colour is complete white.

As used herein, reflectance is measured according to ASTM Test Method 1331 using a spectracolormeter. During testing, a CIE D65 daylight illuminant is used at an angle of 10°.

Laser-marked patterns according to the present disclosure can vary with the surrounding background in terms of L* values, a* values, and/or b* values. The L* values between the pattern and the background, for instance, can vary by greater than about 5%, such as greater than about 15%, such as greater than about 25%, such as greater than about 35%, such as greater than about 45%, such as greater than about 55%, such as greater than about 65%, such as greater than about 75%, and generally less than about 90%, such as less than about 70%, such as less than about 50%, such as less than about 30%, such as less than about 20%, depending upon the particular application.

The a* values between the pattern and the background, for instance, can vary by greater than about 5%, such as greater than about 15%, such as greater than about 25%, such as greater than about 35%, such as greater than about 45%, such as greater than about 55%, such as greater than about 65%, such as greater than about 75%, and generally less than about 90%, such as less than about 70%, such as less than about 50%, such as less than about 30%, such as less than about 20%, depending upon the particular application.

The b* values between the pattern and the background, for instance, can vary by greater than about 5%, such as greater than about 15%, such as greater than about 25%, such as greater than about 35%, such as greater than about 45%, such as greater than about 55%, such as greater than about 65%, such as greater than about 75%, and generally less than about 90%, such as less than about 70%, such as less than about 50%, such as less than about 30%, such as less than about 20%, depending upon the particular application.

In one embodiment, the difference in the laser-marked pattern and the surrounding background can only affect one of the above three values. For instance, the a* value and the b* value between the pattern and the background can have a difference of less than about 10%, such as less than about 5%, whereas the L* value can vary by more than 10%, such as by more than 15%, such as by more than 20%, such as by more than 30%.

In addition to using the CIELab color scale, the differences between the laser-marked pattern and the background can also be quantified using gloss characteristics. Gloss, for instance, can be measured using a gloss meter. For instance, molded products made in accordance with the present disclosure can include a background matrix surface having a glossiness of greater than about 30%, such as greater than about 40%, such as greater than about 50%, such as greater than about 60% when measured at an angle of incidence of 60°. Glossiness can be measured using a gloss meter. For instance, the gloss meter may comprise a gloss meter entitled Micro Tri Gloss having category number 4431 and manufactured by BYK Gardner.

In accordance with the present disclosure, the gloss characteristics between the laser-marked pattern and the surrounding background can vary by more than about 5%, such as by more than about 10%, such as by more than about 20%, such as by more than about 30%, such as by more than about 40%, such as by more than about 50%, such as by more than about 60%, such as by more than about 70%, and generally less than about 90%, such as less than about 80%, such as less than about 70%, such as less than about 60%, such as less than about 50%, such as less than about 40%, depending upon the particular application. In one aspect, the gloss of the laser marked pattern is less than the gloss of the background polymer. Alternatively, the gloss of the laser marked pattern is greater than the gloss of the background polymer.

In one aspect, the laser-marked pattern not only has a different color or shade than the background pattern on the facing surface of the molded article, but also can be a raised surface. For example, in one embodiment, the laser energy not only causes a color change but also causes foaming to occur. During foaming reactions, the polymer composition can produce gas bubbles which creates a raised and textured surface. The amount the surface of the laser-marked pattern is raised can be varied and controlled by controlling the light intensity of the laser beam and the time of contact. The laser-marked pattern, for instance, can be raised from the background pattern in an amount of greater than about 5 microns, such as in an amount greater than about 10 microns, such as in an amount greater than about 20 microns, such as in an amount greater than about 30 microns, such as in an amount greater than about 40 microns, such as in an amount greater than about 50 microns, such as in an amount greater than about 100 microns, such as in an amount greater than about 150 microns, such as in an amount greater than about 200 microns. The amount the laser-marked pattern is raised from the background pattern is generally less than about 1,000 microns, such as less than about 500 microns, such as less than about 300 microns, such as less than about 250 microns. In one embodiment, the laser-marked pattern can be raised from the background pattern in an amount from about 5 microns to about 75 microns. In an alternative embodiment, the laser-marked pattern can be raised from the background pattern in an amount from about 50 microns to about 250 microns.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only and is not intended to limit the invention so further described in such appended claims.

What is claimed:

1. A laser-marked product comprising:

a molded article formed from a polymer composition, the polymer composition comprising a semi-crystalline thermoplastic polymer present in the molded article in an amount greater than about 60% by weight, the polymer composition containing at least one laser activatable agent, the laser activatable agent having an average particle size of greater than about 10 nm and less than about 250 nm, the molded article defining a facing surface having a surface area, and wherein the facing surface includes a laser-marked pattern that has been directly applied to the facing surface, the laser-marked pattern including a plurality of non-linear pattern elements that extend over the facing surface, the laser-marked pattern occupying from about 10% to about 90% of the surface area of the facing surface.

2. A laser-marked product as defined in claim 1, wherein at least some of the non-linear pattern elements have a length of at least about 2.5 cm.

3. A laser-marked product as defined in claim 2, wherein the laser-marked pattern includes a plurality of concentric-like pattern groups, wherein each group includes at least 2 to about 8 non-linear pattern elements.

4. A laser-marked product as defined in claim 1, wherein the laser-marked pattern has a natural stone-like or woodgrain-like appearance.

5. A laser-marked product as defined in claim 1, wherein the laser activatable agent contained in the polymer composition is also a coloring agent.

6. A laser-marked product as defined in claim 1, wherein the polymer composition further comprises at least one coloring agent.

7. A laser-marked product as defined in claim 1, wherein the polymer composition does not contain a coloring agent in addition to the laser activatable additive.

8. A laser-marked product as defined in claim 1, wherein the facing surface displays a background color and a laser-marked pattern color, and wherein the laser-marked pattern color is the same color as the background color but is a different shade.

9. A laser-marked product as defined in claim 1, wherein the facing surface displays a background color and a laser-marked pattern color, and wherein the laser-marked pattern color is a different color than the background color.

10. A laser-marked product as defined in claim 1, wherein the facing surface comprises a background matrix formed from the polymer composition and wherein the laser-marked pattern forms domains within the background matrix.

11. A laser-marked product as defined in claim 5, wherein the at least one coloring agent comprises titanium dioxide particles.

12. A laser-marked product as defined in claim 11, wherein the titanium dioxide particles have been surface treated with an aluminum.

13. A laser-marked product as defined in claim 11, wherein the titanium dioxide particles comprise rutile particles.

14. A laser-marked product as defined in claim 1, wherein the laser activatable additive comprises a metal oxide.

15. A laser-marked product as defined in claim 14, wherein the laser activatable additive comprises antimony trioxide.

16. A laser-marked product as defined in claim 1, wherein the laser activatable additive comprises a black carbonaceous pigment.

17. A laser-marked product as defined in claim 16, wherein the black carbonaceous pigment is formed from bone char from bones of a mammal.

18. A laser-marked product as defined in claim 5, wherein each coloring agent and each laser activatable agent contained in the polymer composition has an average particle size of less than about 250 nm.

19. A laser-marked product as defined in claim 1, wherein the semi-crystalline thermoplastic polymer comprises a polyoxymethylene polymer.

20. A laser-marked product as defined in claim 1, wherein the semi-crystalline thermoplastic polymer comprises a polybutylene terephthalate polymer, a polyamide polymer, a liquid crystal polymer, or a polyarylene sulfide polymer.

21. A laser-marked product as defined in claim 1, wherein the polymer composition further contains a lubricant and a hindered phenolic antioxidant.

22. A laser-marked product as defined in claim 1, wherein the laser-marked product comprises a trim bezel for an automotive interior, a component in a vehicle door handle assembly, a component in a door handle assembly for a consumer appliance product, a medical product, a dashboard component, or a food handling instrument.

23. A laser-marked product as defined in claim 1, wherein the laser-marked pattern is a raised pattern.

24. A laser-marked product as defined in claim 23, wherein the raised pattern of the laser-marked pattern includes portions that are raised from the facing surface in an amount from about 10 microns to about 500 microns.

25. A laser-marked product comprising:

a molded article formed from a polymer composition, the polymer composition comprising a semi-crystalline thermoplastic polymer present in the molded article in an amount greater than about 60% by weight, the polymer composition containing at least one laser activatable agent, the molded article defining a facing surface having a surface area, and wherein the facing surface includes a laser-marked pattern that has been directly applied to the facing surface, the laser-marked pattern including a plurality of non-linear pattern elements that extend over the facing surface, the laser-marked pattern occupying from about 10% to about 90% of the surface area of the facing surface;

wherein at least some of the non-linear pattern elements have a length of at least about 2.5 cm;

wherein the laser-marked pattern includes a plurality of concentric-like pattern groups, wherein each group includes at least 2 to about 8 non-linear pattern elements.

* * * * *